(12) United States Patent
Xu et al.

(10) Patent No.: US 11,968,640 B2
(45) Date of Patent: Apr. 23, 2024

(54) TIMING ADVANCE UPDATE METHOD, TERMINAL, AND BASE STATION

(71) Applicant: HUAWEI TECHNOLOGIES CO., LTD., Guangdong (CN)

(72) Inventors: Chenlei Xu, Hangzhou (CN); Jianwei Zhou, Hangzhou (CN); Zhenjun Jiang, Hangzhou (CN); Hejia Luo, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 17/407,526

(22) Filed: Aug. 20, 2021

(65) Prior Publication Data

US 2021/0392597 A1 Dec. 16, 2021

Related U.S. Application Data

(63) Continuation of application No. PCT/CN2020/075817, filed on Feb. 19, 2020.

(30) Foreign Application Priority Data

Feb. 23, 2019 (CN) .......................... 201910134729.0
Apr. 30, 2019 (CN) .......................... 201910358327.9

(51) Int. Cl.
*H04W 56/00* (2009.01)
*H04W 84/06* (2009.01)

(52) U.S. Cl.
CPC ..... *H04W 56/005* (2013.01); *H04W 56/0035* (2013.01); *H04W 56/009* (2013.01); *H04W 84/06* (2013.01)

(58) Field of Classification Search
CPC ........... H04W 56/005; H04W 56/0035; H04W 56/009; H04W 56/0045; H04W 56/00;
(Continued)

(56) References Cited

U.S. PATENT DOCUMENTS 5,561,838 A 10/1996 Chandos et al.
10,547,374 B1 * 1/2020 Liu .................. H04W 52/42
(Continued)

FOREIGN PATENT DOCUMENTS

CN 104471866 A 3/2015
CN 107197517 A 9/2017
(Continued)

OTHER PUBLICATIONS

Office Action issued in Chinese Application No. 201910358327.9 dated Dec. 31, 2020, 15 pages (with English translation).
(Continued)

*Primary Examiner* — Jianye Wu
(74) *Attorney, Agent, or Firm* — Fish & Richardson P.C.

(57) ABSTRACT

This application provides an example timing advance update method, an example terminal, and an example base station. One example method includes receiving, by a terminal, an updated timing advance TA value and a beam cell identity of a beam cell in which the terminal is located that are sent by a base station. The example method also includes obtaining, by the terminal, corresponding TA compensation information based on the beam cell identity. The example method further includes performing, by the terminal, TA compensation in a TA update period based on the updated TA value and the TA compensation information. The example method also includes sending, by the terminal, uplink data by using a TA value obtained after TA compensation is performed.

17 Claims, 12 Drawing Sheets

(58) Field of Classification Search
CPC ............... H04W 84/06; H04B 7/18519; H04B 7/18573
See application file for complete search history.

(56) References Cited

U.S. PATENT DOCUMENTS

| | | | |
|---|---|---|---|
| 2019/0053193 A1* | 2/2019 | Park | .................. H04L 5/0032 |
| 2020/0029296 A1* | 1/2020 | Myers | .................. G01S 5/0246 |

FOREIGN PATENT DOCUMENTS

| | | | |
|---|---|---|---|
| CN | 107333241 A | 11/2017 | |
| CN | 108024325 A | 5/2018 | |
| CN | 109089308 A | 12/2018 | |
| TW | 201906458 A | 2/2019 | |
| WO | WO-2016044994 A1 * | 3/2016 | ........... H04B 7/0695 |
| WO | 2018082668 A1 | 5/2018 | |

OTHER PUBLICATIONS

Office Action issued in Chinese Application No. 201910358327.9 dated Jul. 13, 2021, 13 pages (with English translation).

PCT International Search Report and Written Opinion issued in PCT/CN2020/075817 dated May 20, 2020, 18 pages (with English translation).

Thales, Nokia, Nokia Shanghai Bell, HNS, "NR-NTN: Preliminary solutions for NR to support non-terrestrial networks," 3GPP TSG RAN Meeting #80, RP-180664, La Jolla, USA, Jun. 11-14, 2018, 16 pages.

Yanhua, "Doppler Shift Calculation and Compensation Study in Mobile Satellite Communication System," Master's Degree Dissertation, Dalian University, May 2013, 61 pages (English abstract).

ZTE Corporation, Sanechips, "Consideration on the cell definition and NTN mobility," 3GPP TSG-RAN WG2 Meeting#104, R2-1817062, Spokane, USA, Nov. 12-16, 2018, 13 pages.

ZTE Corporation, Sanechips, "Consideration on TA management in NTN," 3GPP TSG-RAN WG2 Meeting#104, R2-1817061, Spokane, USA, Nov. 12-16, 2018, 6 pages.

3GPP TR 38.811 V15.0.0 (Jun. 2018), "3rd Generation Partnership Project; Technical Specification Group Radio Access Network; Study on New Radio (NR) to support non terrestrial networks (Release15)," Jun. 2018, 118 pages.

Extended European Search Report issued in European Application No. 20760168.3 dated Feb. 23, 2022, 10 pages.

Thales et al., "NR-NTN:TP for Chap 7.3 NR modifications to support NTN," 3GPP TSG RAN Meeting #80, RP-181394, La Jolla, USA, Jun. 11-14, 2018, 34 pages.

Thales, "NR-NTN: Chap 7.3 NR modifications to support the Non-Terrestrial Network", 3GPP TSG RAN1 Meeting #93, R1-1807794, Busan, Korea, May 21-25, 2019, 43 pages.

Ericsson, "Aspects of Timing Advance," 3GPP TSG-RAN WG2 #100, Tdoc R2-1713531, Reno, US, Nov. 27-Dec. 1, 2017, 6 pages.

* cited by examiner

TIMING ADVANCE UPDATE METHOD, TERMINAL, AND BASE STATION

CROSS-REFERENCE TO RELATED APPLICATIONS

This application is a continuation of International Application No. PCT/CN2020/075817, filed on Feb. 19, 2020, which claims priority to Chinese Patent Application No. 201910358327.9, filed on Apr. 30, 2019 and Chinese Patent Application No. 201910134729.0, filed on Feb. 23, 2019. All of the aforementioned patent applications are hereby incorporated by reference in their entireties.

TECHNICAL FIELD

This application relates to the field of communication technologies, and in particular, to a timing advance update method, a terminal, and a base station.

BACKGROUND

A fifth generation mobile communication network (5G) or a future communication network at a higher level not only needs to meet service requirements of various industries, but also needs to provide wider service coverage. Compared with terrestrial cellular communication, satellite communication has great advantages, such as a longer communication distance, a larger coverage area, and a wider communication frequency band, and can provide a user with a communication service anytime and anywhere. Therefore, satellite communication has very broad application prospect, and has unique advantages especially in aspects such as international and domestic communication, and emergency response and disaster relief. Based on orbital altitudes of satellites, satellite communication systems may be classified into a geostationary earth orbit (GEO) satellite communication system, a medium earth orbit (MEO) satellite communication system, and a low earth orbit (LEO) satellite communication system. A low earth orbit satellite has become a focus because of advantages such as a lower data propagation delay, fewer power losses, lower launch costs, and global coverage.

When uplink transmission is performed an important feature is that different user equipments (UE) perform orthogonal multiple access (OMA) at a time frequency-. In other words, uplink transmission of different UEs from a same cell does not interfere with each other. To ensure orthogonality of uplink transmission and avoid intra-cell interference, a base station requires that times at which signals of different UEs from a same subframe but distributed on different frequency domain resources arrive at the base station are basically aligned. The base station can correctly decode uplink data provided that the base station receives the uplink data sent by the UEs within a cyclic prefix (CP) range. Therefore, uplink synchronization requires that the times at which the signals of the different UEs from the same subframe arrive at the base station fall within the CP range. To ensure time synchronization on a receive side (a base station side), the LTE proposes a timing advance (TA) mechanism. For a UE side, a TA is essentially a negative offset between a start time of receiving a downlink subframe and a time of sending an uplink subframe. The base station may control, by properly controlling an offset of each UE, times at which uplink signals from different UEs arrive at the base station. UE far away from the base station has a relatively high transmission delay. Therefore, the UE needs to send uplink data in advance compared with UE near the base station.

Because a distance and a transmission delay between a satellite and UE also change rapidly, a TA change rate of a satellite communication system is far greater than that of a ground communication system. Therefore, a new TA method is required to meet changing needs including, but not limited to, needs of satellite communication.

SUMMARY

A technical problem to be solved by embodiments of this application is to provide a timing advance update/compensation/adjustment method, a terminal, a network device (base station), a chip, an apparatus, a system, a storage medium, a computer program, a data structure, and the like, to resolve a problem that an existing TA update/compensation/adjustment mechanism cannot meet a TA update/compensation/adjustment requirement in a satellite communication system and any other communication system in which a communication delay is long or an update period cannot be excessively frequent.

According to a first aspect, an embodiment of this application provides a timing advance update method. The method may include:

A terminal receives an updated timing advance TA value and a beam cell identity of a beam cell in which the terminal is located that are sent by a base station.

The terminal obtains corresponding TA compensation information based on the beam cell identity.

The terminal performs TA compensation in a TA update period based on the updated TA value and the TA compensation information.

The terminal sends uplink data by using a TA value obtained after TA compensation is performed.

In a possible implementation, the TA compensation information includes TA compensation data or reference data used to obtain the TA compensation data;

the TA compensation data includes a maximum TA offset and a minimum transmission delay TA offset of a current beam cell; and the reference data includes a satellite orbital altitude and geocentric angle data of the current beam cell, where the geocentric angle data includes a maximum geocentric angle and a minimum geocentric angle; or the reference data includes a Doppler frequency offset of the current beam cell, where the Doppler frequency offset includes an absolute value of a maximum Doppler frequency offset and an absolute value of a minimum Doppler frequency offset.

In a possible implementation, the reference data includes the satellite orbital altitude and the geocentric angle data of the current beam cell, and the terminal obtains, based on the geocentric angle data and the satellite orbital altitude, a round-trip transmission delay change rate of a location corresponding to the geocentric angle data; and the terminal obtains a transmission delay TA offset based on the round-trip transmission delay change rate and a unidirectional transmission delay between a satellite and the location corresponding to the geocentric angle data; or the terminal obtains a TA offset based on the round-trip transmission delay change rate, a unidirectional transmission delay between a satellite and the location corresponding to the geocentric angle data, and current TA update period duration.

In a possible implementation, a transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

In a possible implementation, that the terminal obtains, based on the geocentric angle data and the satellite orbital altitude, a round-trip transmission delay change rate of a location corresponding to the geocentric angle data is specifically performed according to the following formula:

$$T'_a = \frac{2}{c} \times \frac{\omega R(R+h)\sin\theta}{\sqrt{R^2 + (R+h)^2 - 2R(R+h)\cos\theta}},$$

where $T'_\alpha$ represents the round-trip transmission delay change rate of the location corresponding to the geocentric angle data, c represents the speed of light, ω represents a relative angular velocity between the satellite and a user, R represents the Earth radius, h represents the satellite orbital altitude, and θ represents the geocentric angle data.

In a possible implementation, that the terminal obtains a transmission delay TA offset based on the round-trip transmission delay change rate and a unidirectional transmission delay between a satellite and the location corresponding to the geocentric angle data is specifically performed according to the following formula:

$\Delta TA_{trans} = T'_\alpha \times t_{trans}$, where $\Delta TA_{trans}$ represents the transmission delay TA offset, and $t_{trans}$ represents the unidirectional transmission delay between the satellite and the location corresponding to the geocentric angle data.

In a possible implementation, that the terminal obtains a TA offset based on the round-trip transmission delay change rate, a unidirectional transmission delay between a satellite and the location corresponding to the geocentric angle data, and current TA update period duration is specifically performed according to the following formula:

$\Delta TA = T'_\alpha \times (t_{trans} + t_{update})$, where

ΔTA represents the TA offset, and $t_{update}$ represents the current TA update period duration.

In a possible implementation, the reference data includes the satellite orbital altitude and the Doppler frequency offset of the current beam cell, and the terminal obtains a round-trip transmission delay change rate of a current location based on the Doppler frequency offset data and a carrier frequency; and the terminal obtains a transmission delay TA offset based on the round-trip transmission delay change rate and a unidirectional transmission delay of the current location; or the terminal obtains a TA offset based on the round-trip transmission delay change rate, a unidirectional transmission delay of the current location, and current TA update period duration.

In a possible implementation, a transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

In a possible implementation, that the terminal obtains a round-trip transmission delay change rate of a current location based on the Doppler frequency offset data and a carrier frequency is specifically performed according to the following formula:

$$T'_a = \frac{2}{f_c} f_d,$$

where $T'_\alpha$ represents a round-trip transmission delay change rate of a location corresponding to the geocentric angle data, $f_c$ represents the carrier frequency, and $f_d$ represents a Doppler frequency offset of the current location.

In a possible implementation, that the terminal obtains a transmission delay TA offset based on the round-trip transmission delay change rate and a unidirectional transmission delay of the current location is specifically performed according to the following formula:

$\Delta TA_{trans} = T'_\alpha \times t_{trans}$, where $\Delta TA_{trans}$ represents the transmission delay TA offset, and $t_{trans}$ represents a unidirectional transmission delay between a satellite and the location corresponding to the geocentric angle data.

In a possible implementation, that the terminal obtains a TA offset based on the round-trip transmission delay change rate, a unidirectional transmission delay of the current location, and current TA update period duration is specifically performed according to the following formula:

$\Delta TA = T'_\alpha \times (t_{trans} + t_{update})$, where

ΔTA represents the TA offset, and $t_{update}$ represents the current TA update period duration.

In a possible implementation, that the terminal performs TA compensation based on the updated TA value and the TA compensation information includes.

When the terminal and the satellite are close to each other, the terminal adds the updated TA value and an absolute value of any data in the TA compensation data to perform TA compensation.

When the terminal and the satellite are far away from each other, the terminal subtracts the updated TA value from the absolute value of the any data in the TA compensation data to perform TA compensation.

In a possible implementation, that the terminal performs TA compensation based on the updated TA value and the TA compensation information includes:

When the terminal and the satellite are close to each other, the terminal adds the updated TA value and an absolute value of the maximum TA offset to perform TA compensation.

When the terminal and the satellite are far away from each other, the terminal subtracts an absolute value of the minimum transmission delay TA offset from the updated TA value to perform TA compensation.

In a possible implementation, the TA compensation data further includes:

a minimum TA offset and a maximum transmission delay TA offset of the current beam cell; and that the terminal performs TA compensation based on the updated TA value and the TA compensation information includes: The terminal calculates a frame TA offset of each frame of data based on the TA compensation information and a ratio of the TA update period to a data frame length of to-be-sent uplink data.

The terminal performs TA compensation on a TA of each frame of data in the TA update period based on the frame TA offset.

In a possible implementation, when the terminal and a satellite are close to each other, that the terminal calculates a frame TA offset of each frame of data based on the TA compensation information and a ratio of the TA update period to a data frame length includes:

The terminal calculates the frame TA offset based on the maximum TA offset, the maximum transmission delay TA offset, and the ratio of the TA update period to the data frame length of the to-be-sent uplink data.

That the terminal performs TA compensation on a TA of each frame of data in the TA update period based on the frame TA offset includes:

The terminal selects an absolute value of the maximum transmission delay TA offset and adds the absolute value of the maximum transmission delay TA offset and N frame TA offsets; and performs TA compensation on the TA of each frame of data in the TA update period, where N is a sequence number of a data frame, and N is an integer greater than or equal to 1.

In a possible implementation, when the terminal and a satellite are far away from each other, that the terminal calculates a frame TA offset of each frame of data based on the TA compensation information and a ratio of the TA update period to a data frame length includes: The terminal calculates the frame TA offset based on the minimum TA offset, the minimum transmission delay TA offset, and the ratio of the TA update period to the data frame length.

That the terminal performs TA compensation on a TA of each frame of data in the TA update period based on the frame TA offset includes: The terminal selects a negative value of an absolute value of the minimum transmission delay TA offset and subtracts (N−1) frame TA offsets from the negative value of the absolute value of the minimum transmission delay TA offset; and performs TA compensation on the TA of each frame of data in the TA update period, where N is a sequence number of a data frame, and N is an integer greater than or equal to 1.

In a possible implementation, the method further includes:

The terminal obtains location information of the terminal.

The terminal determines a relative location of the terminal in the beam cell based on the location information and a location of an edge point of the beam cell.

The terminal performs linearization processing on a TA offset between two edge points of the beam cell; and obtains a first slope of a TA offset linear change based on the TA offset between the edge points of the beam cell, or obtains a second slope of a transmission delay TA offset linear change based on a transmission delay TA offset between the edge points of the beam cell.

The terminal obtains a TA offset of a current location of the terminal based on the relative location of the terminal and the first slope, or obtains a transmission delay TA offset of a current location of the terminal based on the relative location of the terminal and the second slope.

That the terminal performs TA compensation based on the updated TA value and the TA compensation information includes:

When the terminal and a satellite are close to each other, the terminal adds the updated TA value and an absolute value of the TA offset of the current location of the terminal to perform TA compensation.

When the terminal and the satellite are far away from each other, the terminal subtracts an absolute value of the transmission delay TA offset of the current location of the terminal from the updated TA value to perform TA compensation.

In a possible implementation, the updated TA value sent by the base station and received by the terminal is an updated TA value sent by the base station after compensation is performed based on a transmission delay TA offset at a current moment.

According to a second aspect, an embodiment of this application provides a timing advance update method. The method may include:

A base station sends, to a terminal, an updated timing advance TA value and a beam cell identity of a beam cell in which the terminal is located.

The base station receives uplink data sent by the terminal by using a TA value obtained after TA compensation is performed.

The beam cell identity corresponds to TA compensation information used by the terminal to perform TA compensation on the updated TA value.

In a possible implementation, the TA compensation information includes TA compensation data or reference data used to calculate the TA compensation data;

the TA compensation data includes at least one of the following: a maximum TA offset, a minimum TA offset, a maximum transmission delay TA offset, and a minimum transmission delay TA offset of a current beam cell; and the reference data includes a satellite orbital altitude and geocentric angle data of the current beam cell, where the geocentric angle data includes a maximum geocentric angle and a minimum geocentric angle; or the reference data includes a Doppler frequency offset of the current beam cell, where the Doppler frequency offset includes an absolute value of a maximum Doppler frequency offset and an absolute value of a minimum Doppler frequency offset.

According to a third aspect, an embodiment of this application provides a terminal. The terminal may include:

a transceiver unit, configured to receive an updated timing advance TA value and a beam cell identity of a beam cell in which the terminal is located that are sent by a base station; and a processing unit, configured to obtain corresponding TA compensation information based on the beam cell identity, and perform TA compensation in a TA update period based on the updated TA value and the TA compensation information; where the transceiver unit is further configured to send uplink data by using a TA value obtained after TA compensation is performed.

In a possible implementation, the TA compensation information includes TA compensation data or reference data used to obtain the TA compensation data;

the TA compensation data includes a maximum TA offset and a minimum transmission delay TA offset of a current beam cell; and the reference data includes a satellite orbital altitude and geocentric angle data of the current beam cell, where the geocentric angle data includes a maximum geocentric angle and a minimum geocentric angle; or the reference data includes a Doppler frequency offset of the current beam cell, where the Doppler frequency offset includes an absolute value of a maximum Doppler frequency offset and an absolute value of a minimum Doppler frequency offset.

In a possible implementation, the reference data includes the satellite orbital altitude and the geocentric angle data of the current beam cell, and the processing unit is specifically configured to:

obtain, based on the geocentric angle data and the satellite orbital altitude, a round-trip transmission delay change rate of a location corresponding to the geocentric angle data; and obtain a transmission delay TA offset based on the round-trip transmission delay change rate and a unidirectional transmission delay between a satellite and the location corresponding to the geocentric angle data; or obtain a TA offset based on the round-trip transmission delay change rate, a unidirectional transmission delay between a satellite and the location corresponding to the geocentric angle data, and current TA update period duration.

In a possible implementation, a transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

In a possible implementation, that the processing unit is specifically configured to obtain, based on the geocentric angle data and the satellite orbital altitude, a round-trip transmission delay change rate of a location corresponding to the geocentric angle data is specifically performed according to the following formula:

$$T'_a = \frac{2}{c} \times \frac{\omega R(R+h)\sin\theta}{\sqrt{R^2 + (R+h)^2 - 2R(R+h)\cos\theta}},$$

where $T'_\alpha$ represents the round-trip transmission delay change rate of the location corresponding to the geocentric angle data, c represents the speed of light, ω represents a relative angular velocity between the satellite and a user, R represents the Earth radius, h represents the satellite orbital altitude, and θ represents the geocentric angle data;

In a possible implementation, that the processing unit is specifically configured to obtain a transmission delay TA offset based on the round-trip transmission delay change rate and a unidirectional transmission delay between a satellite and the location corresponding to the geocentric angle data is specifically performed according to the following formula:

$\Delta TA_{trans} = T'_\alpha \times t_{trans}$, where $\Delta TA_{trans}$ represents the transmission delay TA offset, and $t_{trans}$ represents the unidirectional transmission delay between the satellite and the location corresponding to the geocentric angle data.

In a possible implementation, that the processing unit is specifically configured to obtain a TA offset based on the round-trip transmission delay change rate, a unidirectional transmission delay between a satellite and the location corresponding to the geocentric angle data, and current TA update period duration is specifically performed according to the following formula:

$\Delta TA = T'_\alpha \times (t_{trans} + t_{update})$, where $\Delta TA$ represents the TA offset, and $t_{update}$ represents the current TA update period duration.

In a possible implementation, the reference data includes the satellite orbital altitude and the Doppler frequency offset of the current beam cell, and the processing unit is further configured to:

obtain a round-trip transmission delay change rate of a current location based on the Doppler frequency offset data and a carrier frequency; and obtain a transmission delay TA offset based on the round-trip transmission delay change rate and a unidirectional transmission delay of the current location; or obtain a TA offset based on the round-trip transmission delay change rate, a unidirectional transmission delay of the current location, and current TA update period duration.

In a possible implementation, a transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

In a possible implementation, that the processing unit is configured to obtain a round-trip transmission delay change rate of a current location based on the Doppler frequency offset data and a carrier frequency is specifically performed according to the following formula:

$$T'_a = \frac{2}{f_c} f_d,$$

where $T'_\alpha$ represents a round-trip transmission delay change rate of a location corresponding to the geocentric angle data, $f_c$ represents the carrier frequency, and $f_d$ represents a Doppler frequency offset of the current location.

In a possible implementation, that the processing unit is specifically configured to obtain a transmission delay TA offset based on the round-trip transmission delay change rate and a unidirectional transmission delay of the current location is specifically performed according to the following formula:

$\Delta TA_{trans} = T'_\alpha \times t_{trans}$, where $\Delta TA_{trans}$ represents the transmission delay TA offset, and $t_{trans}$ represents a unidirectional transmission delay between a satellite and the location corresponding to the geocentric angle data.

In a possible implementation, that the processing unit is specifically configured to obtain a TA offset based on the round-trip transmission delay change rate, a unidirectional transmission delay of the current location, and current TA update period duration is specifically performed according to the following formula:

$$\Delta TA = T'_\alpha \times (t_{trans} + t_{update}),\text{ where}$$

$\Delta TA$ represents the TA offset, and $t_{update}$ represents the current TA update period duration.

In a possible implementation, the processing unit is specifically configured to:

when the terminal and the satellite are close to each other, add the updated TA value and an absolute value of any data in the TA compensation data to perform TA compensation; and when the terminal and the satellite are far away from each other, subtract the updated TA value from the absolute value of the any data in the TA compensation data to perform TA compensation.

In a possible implementation, the processing unit is specifically configured to:

when the terminal and the satellite are close to each other, add the updated TA value and an absolute value of the maximum TA offset to perform TA compensation; and when the terminal and the satellite are far away from each other, subtract an absolute value of the minimum transmission delay TA offset from the updated TA value to perform TA compensation.

In a possible implementation, the TA compensation data further includes:

a minimum TA offset and a maximum transmission delay TA offset of the current beam cell; and the processing unit is specifically configured to:

calculate a frame TA offset of each frame of data based on the TA compensation information and a ratio of the TA update period to a data frame length of to-be-sent uplink data; and perform TA compensation on a TA of each frame of data in the TA update period based on the frame TA offset.

In a possible implementation, the processing unit is specifically configured to:

when the terminal and a satellite are close to each other, calculate the frame TA offset based on the maximum TA offset, the maximum transmission delay TA offset, and the ratio of the TA update period to the data frame length of the to-be-sent uplink data; and select an absolute value of the maximum transmission delay TA offset and add the absolute value of the maximum transmission delay TA offset and N frame TA offsets; and perform TA compensation on the TA of each frame of data in the TA update period, where N is a sequence number of a data frame, and N is an integer greater than or equal to 1.

In a possible implementation, the processing unit is specifically configured to:

when the terminal and a satellite are far away from each other, calculate the frame TA offset based on the minimum TA offset, the minimum transmission delay TA offset, and the ratio of the TA update period to the data frame length; and select a negative value of an absolute value of the minimum transmission delay TA offset and subtract (N−1) frame TA offsets from the negative value of the absolute value of the minimum transmission delay TA offset; and perform TA compensation on the TA of each frame of data in the TA update period, where N is a sequence number of a data frame, and N is an integer greater than or equal to 1.

In a possible implementation, the processing unit is further configured to:

obtain location information of the terminal;

determine a relative location of the terminal in the beam cell based on the location information and a location of an edge point of the beam cell;

perform linearization processing on a TA offset between two edge points of the beam cell; and obtain a first slope of a TA offset linear change based on the TA offset between the edge points of the beam cell, or obtain a second slope of a transmission delay TA offset linear change based on a transmission delay TA offset between the edge points of the beam cell; and obtain a TA offset of a current location of the terminal based on the relative location of the terminal and the first slope, or obtain a transmission delay TA offset of a current location of the terminal based on the relative location of the terminal and the second slope.

When TA compensation is performed based on the updated TA value and the TA compensation information, the processing unit is specifically configured to:

when the terminal and a satellite are close to each other, add the updated TA value and an absolute value of the TA offset of the current location of the terminal to perform TA compensation; and when the terminal and the satellite are far away from each other, subtract an absolute value of the transmission delay TA offset of the current location of the terminal from the updated TA value to perform TA compensation.

In a possible implementation, the updated TA value sent by the base station and received by the terminal is an updated TA value sent by the base station after compensation is performed based on a transmission delay TA offset at a current moment.

According to a fourth aspect, an embodiment of this application provides a base station. The base station may include:

a sending unit, configured to send, to a terminal, an updated timing advance TA value and a beam cell identity of a beam cell in which the terminal is located; and a receiving unit, configured to receive uplink data sent by the terminal by using a TA value obtained after TA compensation is performed; where the beam cell identity corresponds to TA compensation information used by the terminal to perform TA compensation on the updated TA value.

In a possible implementation, the TA compensation information includes TA compensation data or reference data used to calculate the TA compensation data;

the TA compensation data includes at least one of the following: a maximum TA offset, a minimum TA offset, a maximum transmission delay TA offset, and a minimum transmission delay TA offset of a current beam cell; and the reference data includes a satellite orbital altitude and geocentric angle data of the current beam cell, where the geocentric angle data includes a maximum geocentric angle and a minimum geocentric angle; or the reference data includes a Doppler frequency offset of the current beam cell, where the Doppler frequency offset includes an absolute value of a maximum Doppler frequency offset and an absolute value of a minimum Doppler frequency offset.

According to a fifth aspect, a method is provided. The method may include: receiving a TA value sent by a network device; obtaining a TA change rate; and communicating with a base station based on the TA change rate and the TA value.

In a possible implementation, the communicating with the base station based on the TA change rate and the TA value includes, compensating for the TA value based on the TA change rate, and communicating with the network device based on a TA value obtained after compensation is performed. It should be understood that compensation herein may also be referred to as a similar term, for example, update or adjustment, and the TA value is mainly increased or decreased based on the TA change rate, to resolve a communication problem caused by untimely update of the TA value.

In a possible implementation, the obtaining a TA change rate includes one or more of the following methods: receiving one or more TA change rates; obtaining the TA change rate based on received TA change rate indication information, where there is a correspondence between the TA change rate indication information and the TA change rate (it may be understood that the correspondence further includes a correspondence between a coverage area and the TA change rate indication information and/or a correspondence between a reference location and the TA change rate indication information); obtaining the TA change rate based on equivalent information; or obtaining the TA change rate that is stored in a terminal.

In a possible implementation, the obtaining a TA change rate includes two methods. One method is to obtain a part of the TA change rate, and the other method is to obtain the other part of the TA change rate. It may be understood that this implementation may be applied to a transparent transmission scenario. A TA change rate from the terminal to a satellite is obtained in one manner, and a TA change rate from the satellite to the base station is obtained in another manner.

In a possible implementation, the TA change rate includes one or more of the following: an offset of the TA change rate, a scaling value of the TA change rate based on a unit step, or a TA variation in a unit time. The unit step or the unit time may be preconfigured (for example, agreed in a protocol in advance), or may be received from the network device. Certainly, there may alternatively be another manner. The receiving from the network device includes: receiving the unit step or the unit time, or receiving unit step indication information or unit time indication information. It may be understood that preconfiguration may alternatively refer to being configured to receive the unit step or the unit time, or receive the unit step indication information or the unit time indication information. There is a correspondence between the unit step indication information and the unit step, and there is a correspondence between the unit time indication information and the unit time.

In a possible implementation, the obtaining the TA change rate based on equivalent information includes: selecting a TA change rate from the received one or more TA change rates based on the equivalent information; or calculating the TA change rate based on the equivalent information, where the equivalent information may be received and sent by the network device, or may be directly obtained by the terminal.

In a possible implementation, the equivalent information includes one or more of the following: a Doppler frequency offset; an orbital altitude and an elevation angle between the terminal and the network device; an orbital altitude and a flare angle between the terminal and the network device; or an orbital altitude and a geocentric angle between the terminal and the network device. It may be understood that all information that can be used to calculate or select the TA change rate may be referred to as equivalent information. The foregoing is merely an example of the equivalent information, and is not a limitation.

In a possible implementation, before the compensating for the TA value based on the TA change rate, the method further includes, adjusting the TA change rate based on the received one or more TA values. It may be understood that the terminal may continuously periodically receive TA values. If the terminal accesses the network device for a period of time, the terminal receives a plurality of TA values because the terminal may adjust the TA change rate based on the plurality of previously received TA values. Generally, if the plurality of TA values change greatly, it indicates that the terminal needs to adjust the TA change rate more.

In a possible implementation, the TA change rate includes one or more of the following: a common TA change rate, a specific TA change rate, a difference between the common TA change rate and the TA change rate, or a difference between two specific TA change rates. The common TA change rate may be a TA change rate of a reference location in the coverage area of the network device. The specific TA change rate may be a TA change rate of a location in which the terminal is located. The common TA change rate may be sent to one terminal, a plurality of terminals (the plurality of terminals may be a group of terminals; for example, a plurality of terminals that are geographically close or have a same moving speed may be considered as a group) or all terminals in the coverage area. This is not limited in this application. In addition, the common TA change rate may be sent by using broadcast information, or may not be sent by using broadcast information. The specific TA change rate may be sent to one terminal or to a group of terminals (a condition of grouping may be similar to that in the foregoing).

In a possible implementation, the coverage area includes one or more cells covered by the network device, a projection area of one or more beams of the network device on the ground, some areas of one cell covered by the network device, or some areas of projection of one beam of the network device on the ground. It may be understood that the coverage area may alternatively be divided in another manner, and generally may be a part or all of the area that can be covered by the network device.

In a possible implementation, the network device may send information (including but not limited to one or more of the following information: the TA change rate, the TA change rate indication information, the equivalent information, the unit step, or the unit time) by using one or more of an SIB, RRC, DCI, a MIB, a TAC, or a PDSCH. It may be understood that if the PDSCH is used, the one or more of the following information may further be sent on the PDSCH together with downlink data or delivered on a separately allocated PDSCH (it may be understood that the PDSCH is not used to send other information). Generally, the PDSCH is usually used to send the specific TA change rate.

In a possible implementation, the information sent by the network device may be sent together with the TA value or separately sent, or sending periods may be the same or different. It may be understood that, if the information sent by the network device is sent together with the TA value, the sending periods may be the same. If the sending periods are different, the foregoing information may be sent one or more times between two times of sending TA values, or the foregoing information may be sent once between a plurality of times of sending TA values. If the information sent by the network device is sent together with the TA value, the information sent by the network device and the TA value may be in one message or not in one message.

In a possible implementation, the foregoing information is sent in the SIB, the RRC, the DCI, the MIB, the TAC, or the PDSCH, and may be a newly added field in the information, or reuse an original field in the information.

In a possible implementation, in a satellite regeneration scenario, the TA change rate may be obtained only during initial access, and the TA change rate does not need to be obtained subsequently.

According to a sixth aspect, a communication method is provided, including, sending, by a network device, a TA value to one or more terminals; sending one or more of the following information: a TA change rate, TA change rate indication information, equivalent information, a unit step, or a unit time; and communicating with the terminal based on the TA value.

In a possible implementation, the TA change rate includes one or more of the following: an offset of the TA change rate, a scaling value of the TA change rate based on a unit step, or a TA variation in a unit time. The unit step or unit time may be preconfigured, or may be sent by the network device. The network device may send the unit step or the unit time, or sending unit step indication information or unit time indication information.

In a possible implementation, there is a correspondence between the TA change rate indication information and the TA change rate, and the correspondence further includes a correspondence between a coverage area and the TA change rate indication information and/or a correspondence between a reference location and the TA change rate indication information.

In a possible implementation, the equivalent information includes one or more of the following: a Doppler frequency offset; an orbital altitude and an elevation angle between the terminal and the network device; an orbital altitude and a flare angle between the terminal and the network device; or an orbital altitude and a geocentric angle between the terminal and the network device.

In a possible implementation, the TA change rate includes one or more of the following, a common TA change rate, a specific TA change rate, or a difference between the common change rate and the TA change rate. The common TA change rate may be a TA change rate of a reference location in a coverage area of the network device. The specific TA change rate may be a TA change rate of a location in which the terminal is located.

In a possible implementation, the coverage area includes one or more cells covered by the network device, a projection area of one or more beams of the network device on the ground, some areas of one cell covered by the network device, or some areas of projection of one beam of the network device on the ground.

In a possible implementation, the sending one or more of the following information includes sending by using an SIB, RRC, DCI, a MIB, a TAC, or a PDSCH. The one or more of the following information may be sent together with other data on the PDSCH, or may be sent separately on the PDSCH.

In a possible implementation, the one or more of the following information is not sent together with TA information; the one or more of the following information is sent together with TA information; or a sending period of the one or more of the following information is the same as or different from a sending period of the TA information.

According to a seventh aspect, an apparatus is provided. The apparatus provided in this application has a function of implementing behavior of the terminal or the base station (the network device or the satellite) in the foregoing method aspects, and includes corresponding means (means) configured to implement the steps or functions described in the foregoing method aspects. The steps or functions may be implemented by using software, hardware (for example, a circuit), or a combination of hardware and software.

In a possible design, the apparatus includes one or more processors and a communication unit. The one or more processors are configured to support the apparatus in performing a corresponding function of the terminal and/or the base station (or the network device or the satellite) in the foregoing methods. For example, corresponding TA compensation information is obtained based on a beam cell identity. The communication unit is configured to support the apparatus in communicating with another device, to implement a receiving function and/or a sending function. For example, an updated TA value and the beam cell identity that are sent by the base station are received.

Optionally, the apparatus may further include one or more memories. The memory is coupled to the processor, and the memory stores program instructions and/or data that are/is necessary for the apparatus. The one or more memories may be integrated with the processor, or may be disposed independent of the processor. This is not limited in this application.

The apparatus may be an intelligent terminal, a wearable device, or the like. The communication unit may be a transceiver or a transceiver circuit. Optionally, the transceiver may alternatively be an input/output circuit or an interface.

The apparatus may alternatively be a chip, and the communication unit may be an input/output circuit or an interface that is of the chip.

In another possible design, the apparatus includes a transceiver and a processor. The processor is configured to run computer programs in the memory, to enable the apparatus to perform the method according to any one or more of the first aspect to the sixth aspect. The memory may be disposed inside the apparatus or outside the apparatus.

According to an eighth aspect, a system is provided. The system includes the terminal and the base station (or includes the terminal; the satellite and the base station; or the terminal and the satellite).

According to a ninth aspect, a computer-readable storage medium is provided, configured to store computer programs. The computer programs are used to perform the method in any one or more of the first aspect to the sixth aspect.

According to a tenth aspect, a computer program product is provided. The computer program product includes computer program code. When the computer program code is run on a computer, the computer is enabled to perform the method in any one or more of the first aspect to the sixth aspect.

According to an eleventh aspect, an apparatus is provided, configured to implement the method in any one or more of the first aspect to the sixth aspect.

According to a twelfth aspect, an apparatus is provided, including a receiving unit, configured to receive a TA value sent by a network device; an obtaining unit, configured to obtain a TA change rate; and a transceiver unit, configured to communicate with a base station based on the TA change rate and the TA value (the transceiver unit may include the receiving unit and a sending unit, and the two may be disposed separately or combined).

In a possible implementation, the obtaining unit is specifically configured to compensate for the TA value based on the TA change rate, and the transceiver unit is specifically configured to communicate with the network device based on a TA value obtained after compensation is performed.

In a possible implementation, the obtaining unit is specifically configured to receive one or more TA change rates;

or obtain the TA change rate based on received TA change rate indication information, where there is a correspondence between the TA change rate indication information and the TA change rate; obtain the TA change rate based on equivalent information; or obtain the TA change rate stored in the apparatus (where the obtaining unit may sometimes be the same as the receiving unit).

In a possible implementation, the obtaining unit is specifically configured to obtain a part of the TA change rate according to one method, and obtain the other part of the TA change rate according to the other method. It may be understood that this may be applied to a transparent transmission scenario A TA change rate from a terminal to a satellite is obtained in one manner, and a TA change rate from the satellite to the base station is obtained in another manner.

In a possible implementation, the obtaining unit is specifically configured to select a TA change rate from the received one or more TA change rates based on the equivalent information; or calculate the TA change rate based on the equivalent information.

In a possible implementation, the receiving unit is further configured to: adjust the TA change rate based on the received one or more TA values.

In a possible implementation, the TA change rate includes one or more of the following, a common TA change rate, a specific TA change rate, or a difference between the common change rate and the TA change rate. The common TA change rate may be a TA change rate of a reference location in a coverage area of the network device. The specific TA change rate may be a TA change rate of a location in which the terminal is located. The common TA change rate may be sent to one terminal, a plurality of terminals (the plurality of terminals may be a group of terminals; for example, a plurality of terminals that are geographically close or have a same moving speed may be considered as a group) or all terminals in the coverage area. This is not limited in this application. In addition, the common TA change rate may be sent by using broadcast information, or may not be sent by using broadcast information. The specific TA change rate may be sent to one terminal or to a group of terminals (a condition of grouping may be similar to that in the foregoing).

In a possible implementation, the coverage area includes one or more cells covered by the network device, a projection area of one or more beams of the network device on the ground, some areas of one cell covered by the network device, or some areas of projection of one beam of the network device on the ground.

In a possible implementation, in a satellite regeneration scenario, the TA change rate may be obtained only during initial access, and the TA change rate does not need to be obtained subsequently.

According to a thirteenth aspect, an apparatus is provided, including: a sending unit, configured to send a TA value to one or more terminals, where the sending unit is further configured to send one or more of the following information: a TA change rate, TA change rate indication information, equivalent information, a unit step, or a unit time; and a transceiver unit, configured to communicate with the terminal based on the TA value (the transceiver unit may include a receiving unit and a sending unit, and the two may be combined or disposed separately).

In a possible implementation, the sending unit is specifically configured to send the information by using an SIB, RRC, DCI, a MIB, a TAC, or a PDSCH. The one or more of the following information may be sent together with other data on the PDSCH, or may be sent separately on the PDSCH.

In a possible implementation, one or more of the following information sent by the sending unit is not sent together with TA information; one or more of the following information is sent together with TA information; or a sending period of one or more of the following information is the same as or different from a sending period of TA information.

According to the foregoing method, the apparatus, the storage medium, the program, or the chip, the apparatus may compensate for the received TA value based on the obtained TA compensation information or the TA change rate (or the common TA change rate) of the apparatus. This avoids inter-user interference caused by a TA offset and avoids affecting uplink decoding performance.

BRIEF DESCRIPTION OF DRAWINGS

To describe technical solutions in embodiments of this application or in the background more clearly, the following describes accompanying drawings used in describing the embodiments of this application or the background.

DESCRIPTION OF EMBODIMENTS

Figure 1:
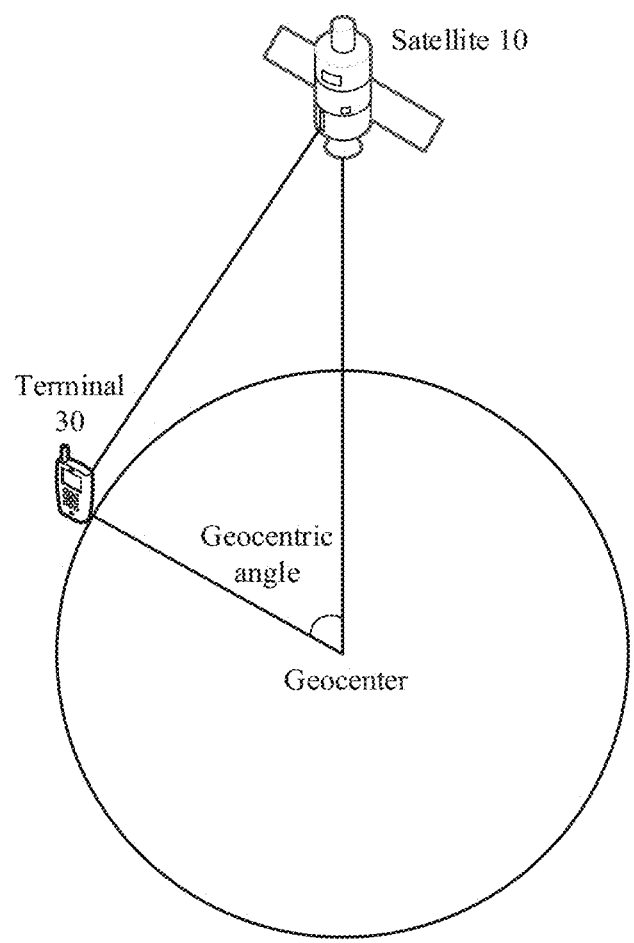
FIG. 1 is a schematic diagram of an architecture of a satellite communication system according to an embodiment of this application.

The following describes embodiments of this application with reference to accompanying drawings in the embodiments of this application.

The terms "include", "have", and any other variant thereof in the specification, claims, and the accompanying drawings of this application, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A so-called terminal in technical solutions in the embodiments of this application may be a device that has a communication function. The terminal may include a handheld device, a vehicle-mounted device, a wearable device, or a computing device that has a wireless communication function, another processing device connected to a wireless modem, or the like. The terminal may have different names in different networks such as an access terminal, user equipment (UE), a subscriber unit, a subscriber station, a mobile station, a mobile console, a remote station, a remote terminal, a mobile device, a user terminal, a wireless communication device, a user agent or a user apparatus, a handheld device or a computing dev ice that has a wireless communication function, another processing device connected to a wireless modem, a vehicle-mounted device, a wearable device, and a terminal device in a 5G network. The terminal device may communicate with one or more core networks by using a radio access network (RAN), or may be connected to a distributed network in a self-organizing manner or a grant-free manner. The terminal device may be alternatively connected to a wireless network in another manner for communication, or the terminal device may directly perform wireless communication with another terminal device. This is not limited in the embodiments of this application.

A so-called base station (or referred to as a network device, or referred to as a ground station) in the embodiments of this application may be a device deployed in a radio access network to provide a wireless communication function. The base station may have different names in different radio access systems. For example, a base station in a universal mobile telecommunication system (UMTS) network is referred to as a NodeB (NodeB), a base station in an LTE network is referred to as an evolved NodeB (eNB, or eNodeB), a base station in a new radio (NR) network is referred to as a transmission reception point (TRP) or a next-generation NodeB (gNB), or base stations in other networks in which a plurality of technologies are converged or in other various evolved networks may have other names. The present disclosure is not limited thereto. In this application, the base station may be deployed on a satellite, or may be deployed on a ground station.

A so-called satellite in the embodiments of this application refers to an apparatus that periodically orbits a planet in a closed orbit. Based on orbital altitudes of satellites, the satellites may be classified into a geostationary earth orbit (GEO) satellite, a medium earth orbit (MEO) satellite, and a low earth orbit (LEO) satellite. The satellite may have a satellite-borne data processing capability because a network device is deployed, or equipment that can only perform spectrum transfer on received data may be deployed, and the data is forwarded to a network device deployed on the ground for processing.

Compensation in the embodiments of this application may also be referred to as adjustment, and includes increase, decrease, and the like. This is not limited in this application.

An indication in the embodiments of this application may include a direct indication and an indirect indication. The direct indication may be directly sending or notifying information that needs to be indicated. The indirect indication may be sending other information, and the information may indirectly indicate information that needs to be obtained. Alternatively, the information originally indicates other information, but in this application, the information may also indicate the information that needs to be indicated. Alternatively, required information may be obtained after calculation is performed based on indicated information.

A TA value in the embodiments of this application is an offset between a start time of receiving a downlink subframe by a terminal and a start time of sending an uplink subframe by the terminal. A network device may indicate a dedicated TA value to each terminal, and control a time offset at which uplink signals from different terminals arrive at the network device within an error allowed range, to avoid interference between signals from different terminals in a cell.

A TA change rate in the embodiments of this application refers to a change speed of a TA value with time, and describes a change speed of the TA value. It should be understood that the TA change rate in this application includes not only the TA change rate itself, but also may be an offset of the TA change rate. The offset may be an offset for a previously received TA change rate (or a TA offset), or may be an offset for another value. In this way, a quantity of bits to be sent can be reduced.

Equivalent information in the embodiments of this application may be a parameter or a variable that can be mutually deduced or converted from a TA change rate by using a theoretical formula. Generally, information that can be mutually converted from the TA change rate includes Doppler frequency offset information, information about combining an angle, for example, an elevation angle, a flare angle, or a geocentric angle, between a terminal and a satellite with an orbital altitude, and the like. The equivalent information is merely briefly used as an example herein, and the equivalent information is not limited to the foregoing information.

A unit step in the embodiments of this application may be that a unit length is used as a quantization unit. It may be understood that the unit step is a scaling amount, and use of the unit step can reduce bits to be transmitted. For example, a unit of a TA change rate is us/s, two us/s (namely, 2 us/s) is used as a unit step, +2 indicates that the TA change rate is +4 us/s, and −3 indicates that the TA change rate is −6 us/s. For another example, a minimum sampling time length used in an existing protocol is Tc, 16×64 Tc is used as a unit step, and a network device indicates that a TA value may use the step as a quantization unit. If the network device indicates that the TA value is equal to 6, it indicates that an actual TA adjustment amount is 6×(16×64×Tc). Herein, a unit and a length used for definition of the unit step are not limited.

A unit time in the embodiments of this application may be that a specific time length is used as a quantization unit. For example, the unit time may be a time (for example, 1 ms or 1 s) that uses an existing time unit as a length, an agreed time of a fixed length (for example, 2 s or 10 s), a timeout time of a specified timer (for example, a configurable timeout time of an uplink time alignment timer, namely, 500 ms), or the like. Herein, a unit and a length used for definition of the unit time are not limited.

FIG. 1 is a schematic diagram of an architecture of a satellite communication system according to an embodiment of this application. In the architecture shown in FIG. 1, the satellite communication system includes a satellite 10, a base station 20 (the base station 20 in FIG. 1 is integrated on the satellite 10), a terminal 30, and the like.

The satellite 10 is located in space, and may communicate with a ground station and the terminal 30.

The base station 20 may be disposed with the satellite 10 in an integrated manner, and the satellite implements a function of the base station 20. This communication system scenario may be referred to as a satellite regeneration scenario (as shown in FIG. 1).

Figure 15:
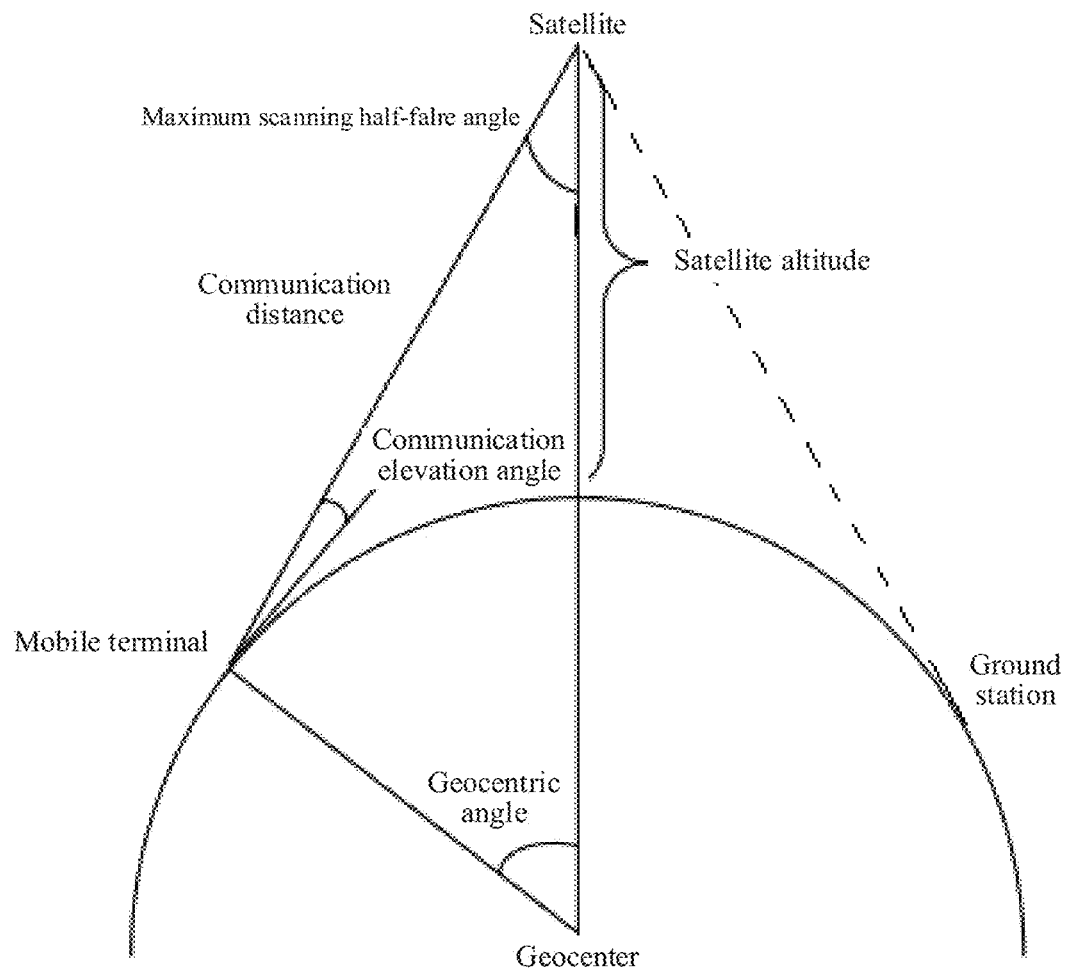
FIG. 15 is a schematic diagram of an architecture of another satellite communication system according to an embodiment of this application.

Alternatively, the base station 20 and the satellite 10 may be independently disposed in the communication system. The base station 20 may send data to the terminal 30 by using the satellite 10, or may send control signaling and data to the terminal 30 independently. For example, the base station 20 may periodically send an updated TA value to the terminal 30, so that the terminal 30 processes uplink data based on the received updated TA value. Beam cells may be further divided, the beam cells are numbered, and then the beam cell identities may be sent to the terminal 30, so that the terminal 30 knows a beam ceil in which the terminal 30 is located, and compensates for the received updated TA value based on TA compensation information corresponding to a beam cell identity. For another example, if the base station 20 is on the ground station, uplink communication may include two parts: a part from the terminal 30 to the satellite 10, and a part from the satellite 10 to the base station 20; and downlink communication also includes two parts: a part from the base station 20 to the satellite 10, and a part from the satellite 10 to the terminal 30. The part between the base station and the satellite may be referred to as a feed link, and the part between the satellite and the terminal may be referred to as a user link. In this example, the satellite 10 does not have a processing capability or has a relatively weak processing capability, and requires assistance from the base station 20. This communication scenario may be referred to as a satellite transparent transmission scenario (as shown in FIG. 15).

It should be understood that when the base station 20 and the satellite 10 are disposed separately, a method performed by the base station 20 in this application may be performed by the satellite 10 independently or by the satellite 10 together with the base station 20. A method independently performed by the satellite 10 in this application may alternatively be performed by the base station 20 independently or performed by the satellite 10 together with the base station 20. This is not limited in this application.

In the communication system, a TA value is usually updated according to a specific period, and an update period of the TA value may be 2 Hz. An update frequency of the TA value may further be that a TA update command (which carries the TA value) is sent once within 500 ms. For example, a network device delivers, to the terminal, a TA value (which may also be referred to as a TA adjustment command that carries the TA value) whose adjustment granularity is an integer multiple of $16 \cdot 64/2^{\mu} \cdot T_c$. The terminal receiVes the TA value and perform TA update (or referred to as TA adjustment) (based on only the TA value, or based on the TA value together with another indication), where $Tc=1/(480\times10^3\times4096)=0.509\times10^{-6}$ ms may be a time length unit, and $\mu$ may be an index of a subcarrier width. The TA adjustment command has the following two formats:

During initial access, a TA adjustment command of $x_1$ bits is used, and this value indicates an index of an amount of time to be adjusted by the terminal. After receiving the command, the terminal adjusts an uplink transmission timing. In this case, the adjustment is performed relative to a downlink transmission timing of the terminal. This allows the network device to set a timing advance amount within a range from 0 to a maximum TA value by using the $16 \cdot 64/2^{\mu}$ multiples of $T_c$ as a step.

After uplink synchronization is completed during initial access, the TA value of the terminal further needs to be continuously updated, to cope with a change in a transmission time used by a channel to reach the network device due to changes in locations of the terminal and the network device or a change in a channel environment. A TA update process may be that the network device sends a TA update command of $x_2$ bits (which may be similar to the TA adjustment command), to indicate the terminal to adjust a new transmission timing of the terminal based on an original uplink transmission timing. The update command also uses the $16 \cdot 64/2^{\mu}$ multiple of $T_c$ as a step to adjust the TA value within a range specified in a protocol. An updated TA value of may be positive or negative. A positive value indicates that a transmission delay between the terminal and the network device increases, and a negative value indicates that a transmission delay between the terminal and the network device decreases.

In addition, in the communication system, a TA offset includes not only a transmission delay TA offset, but also an update period TA offset. Because a transmission delay of a signal from the satellite to the terminal is relatively high, when the terminal receives a TA delivered by the satellite, a transmission delay TA offset has occurred between an actual TA value at a current moment and the TA value received by the terminal. In addition, in a TA update period, with further development of time, the update period TA offset is also generated between the actual TA value at the current moment and the TA value received by the terminal. As a result, a larger offset occurs between the actual TA value and the TA value received by the terminal.

The terminal 30 may perform data communication with the satellite 10 or the base station 20, may receive control signaling and downlink data that are sent by the satellite 10 or the base station 20, and may further send uplink data to the satellite 10 or the base station 20 to complete transmission of various service data. The terminal 30 may obtain the TA compensation information by receiving the updated TA value and the beam cell identity that are sent by the base station 20 to perform TA compensation on the updated TA value, thereby reducing an offset between the updated TA value and the actual TA. This avoids interference between different terminals and impact on decoding performance that are caused by a TA offset, and improves communication performance of the satellite communication system.

Figure 11:
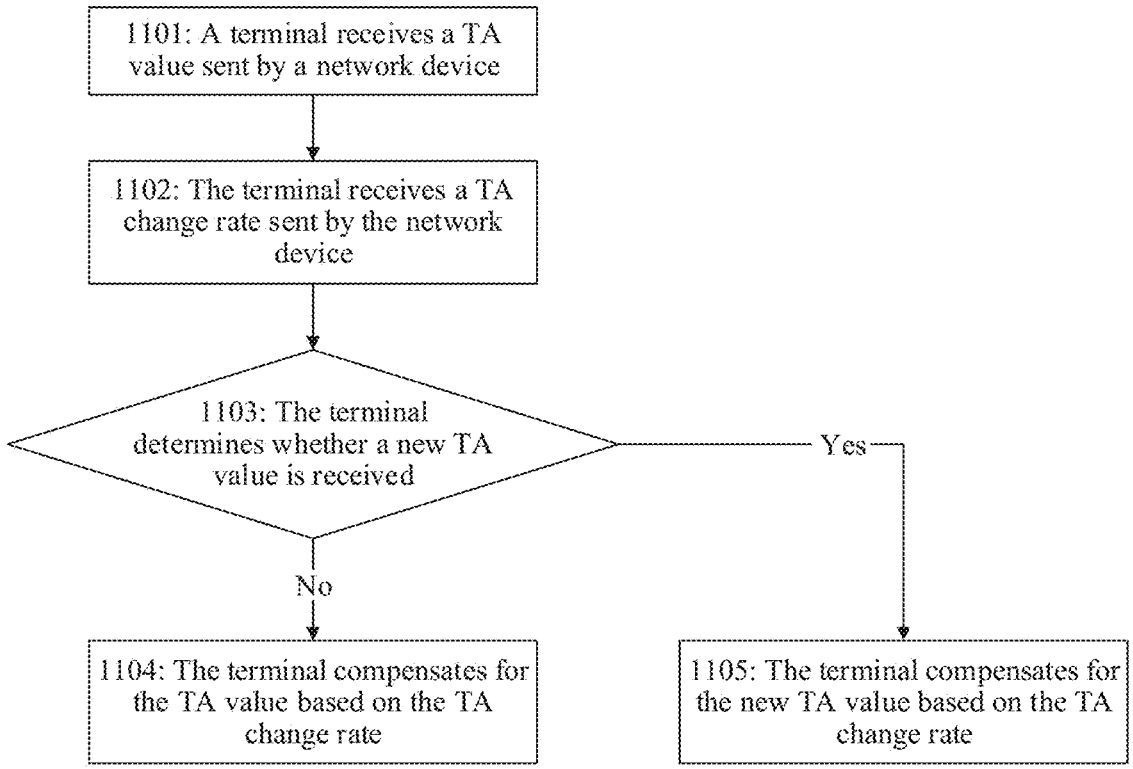
FIG. 11 is a flowchart of another method according to an embodiment of this application.
Figure 12:
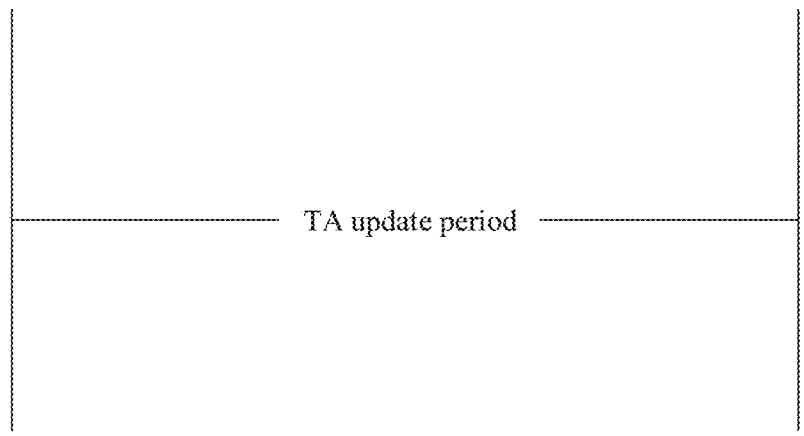
FIG. 12 is a flowchart of another method according to an embodiment of this application.
Figure 13:
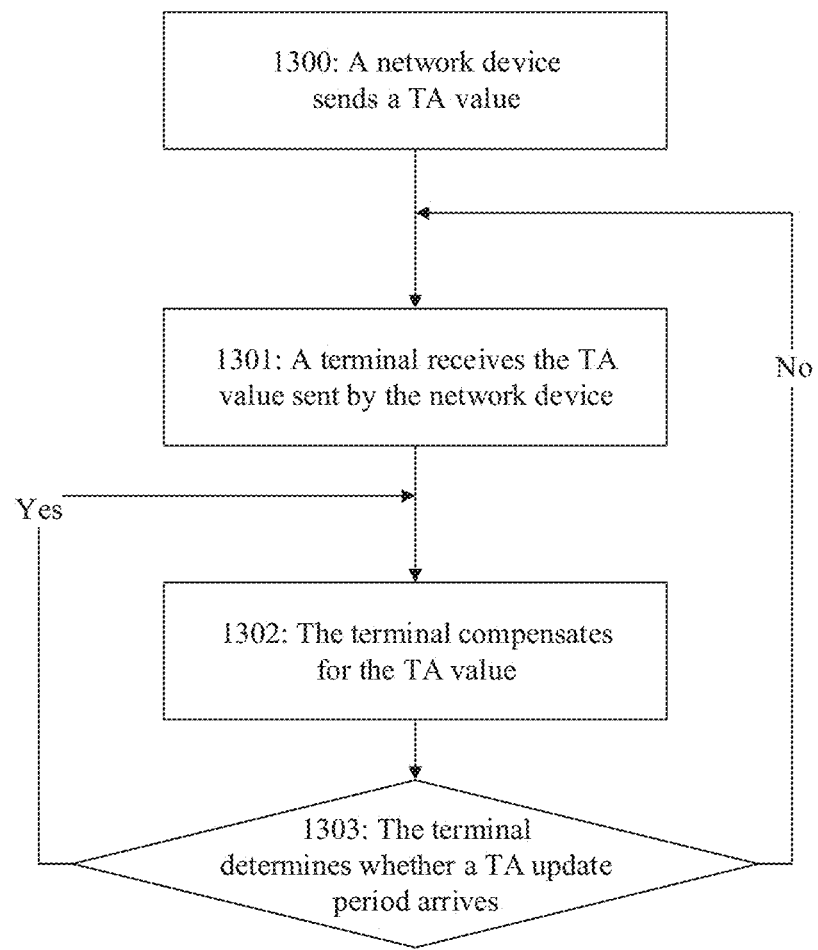
FIG. 13 is a flowchart of another method according to an embodiment of this application.

As shown in any one or more of FIG. 10 to FIG. 13, optionally, the network device receives an uplink reference signal sent by the terminal (1001), for example, signals such as an uplink random access preamble, an SRS , a DMRS , and a PUCCH . The network device obtains the TA value of the corresponding terminal based on the uplink reference signal. The network device sends the TA value (periodically) to the terminal (1002 or 1300). The terminal receives the TA value sent by the network device (1002, 1101, or 1301). The network device sends a TA change rate value, a specific change rate, or equivalent information to the terminal (1003). The terminal receives the TA change rate value, the specific change rate, or the equivalent information sent by the network device (1003, 1102, or 1301. The terminal obtains a TA change rate indicated by the network device or equivalent information of the TA change rate (1003 or 1301), or estimates the TA change rate by itself. The terminal determines whether a new TA value is received (1103). In response to a new TA value not being received or before a new TA value is received, the terminal compensates for the received TA value sent by the network device based on the TA change rate (1004, 1104, or 1302). In response to the new TA value being received, the terminal compensates for the received new TA value based on the TA change rate (1105). The terminal sends a TA value obtained after compensation is performed to the network device (1005). FIG. 11 shows a TA update period between when a terminal receives a TA value to when the terminal receives a new TA value. The terminal determines whether a TA update period has arrived (1303). In response to determining that the TA update period has arrived, the terminal compensates for the TA value (1302). In response to determining that the TA update period has not arrived, the terminal receives the TA value sent by the network device (1301).

In a possible implementation, the terminal compensates for the received TA value based on a common TA change rate indicated by the network device (including a direct indication and an indirect indication) and the received TA value; and communicates with the network device based on a TA value obtained after compensation is performed.

In a possible implementation, the terminal adjusts a common TA change rate based on a common TA change rate indicated by the network device (including a direct indication and an indirect indication) and the received TA value, and compensates for the received TA value based on a common TA change rate obtained after adjustment is performed; and communicates with the network device based on a TA value obtained after compensation is performed.

In another possible implementation, the terminal compensates for the received TA value based on the TA value indicated by the network device and a change rate of the terminal, and communicates with the network device based on a TA value obtained after compensation is performed.

In this embodiment of this application, for ease of description and consistency, generally, an example in which the base station 20 is integrated on the satellite 10 is used for description. When the base station 20 is located in the communication system, a forwarding procedure of the satellite 10 may be added. Generally, other procedures are similar. It may be understood that the other procedures may alternatively be different. Different scenarios may be described by using examples below.

The following describes in detail a timing advance update method in this application with reference to FIG. 2 to FIG. 14.

Figure 2:
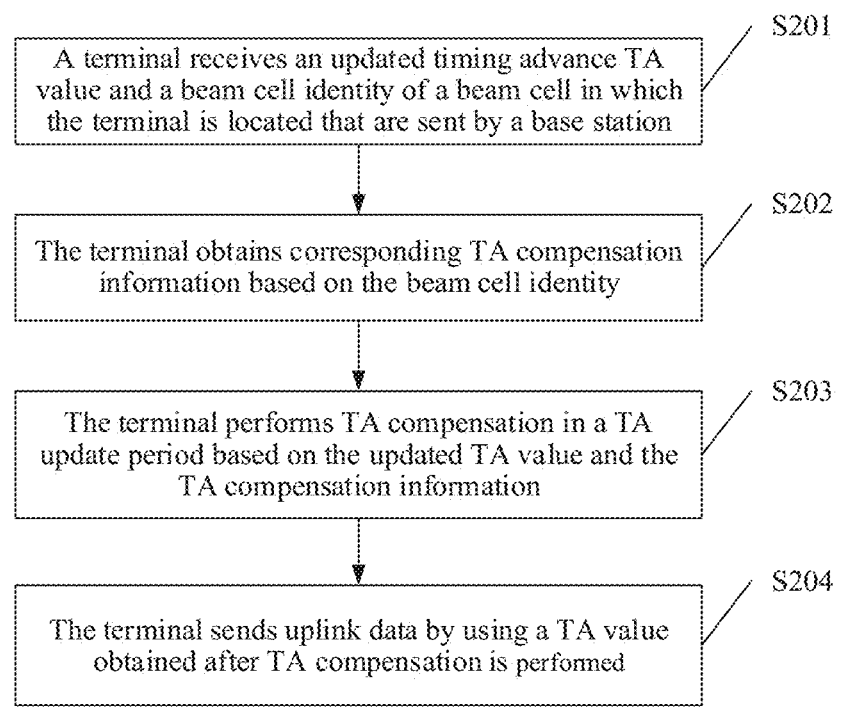
FIG. 2 is a schematic flowchart of a timing advance update method according to an embodiment of this application.

FIG. 2 is a schematic flowchart of a timing advance update method according to an embodiment of this application. The method specifically includes the following steps.

S201: A terminal receives an updated timing advance TA value and a beam cell identity of a beam cell in which the terminal is located that are sent by a base station.

Optionally, the base station may update a TA value according to a specific period by using a signal, for example, a random access preamble or a sounding reference signal (Sounding Reference Signal, SRS for short), and send a TA update command to the terminal. The terminal receives, according to the same period, the updated TA value sent by the base station.

Optionally, the base station may send the beam cell identity by sending a radio resource control (RRC) protocol, a system information block (SIB), downlink control information (DCI), a master information block (MIB), or other signaling. Alternatively, the base station may alternatively send the updated TA value and/or the beam cell identity by constructing information signaling. This is not limited in this embodiment of this application.

Before sending the beam cell identity, the base station may divide the over-the-top period of the satellite into a plurality of areas based on a parameter, for example, an angle, a time, or a projection size corresponding to the ground, where each area has a unique number and a respective TA pre-compensation value. Each area may be a cell. Generally, a range of a satellite cell generally corresponds to projection of a satellite beam on the ground. Each area may alternatively include a plurality of satellite beams or a plurality of cells, or may include only some areas in one satellite beam. In a new radio access technology (New Radio access technology, NR for short), different small beams may exist in a same cell. For example, a synchronization signal block (Synchronization Signal Block, SSB for short) corresponds to different beams in a cell. These beams may be designed to show a characteristic of specific angle or geographical area distribution in a ground view, and these beam sets may also be used as divided areas. In addition, there may be a dedicated tracking beam for one terminal or a group of terminals, and these tracking beams for one cell may also be used as divided areas.

For example, intervals may be divided by using an example of a geocentric angle range obtained when the satellite goes over the top of the terminal, and a unique number is set for each interval as a beam cell identity, and the beam cell identity may be used by the terminal or another device to distinguish and identify a beam cell. The beam cell identity may also be referred to as a number of a beam cell, an identifier of a beam cell, or the like. This is not limited in this embodiment of this application.

S202: The terminal obtains corresponding TA compensation information based on the beam cell identity.

The beam cell identity is bound to the TA compensation information. The base station may send the TA compensation information together with the beam cell identity to the terminal by using the foregoing signaling, or may send the TA compensation information and the beam cell identity separately. Alternatively, when angles of all beam cells remain unchanged, the TA compensation information may be stored on the terminal side as local information. This is not limited in this embodiment of this application, either.

In this embodiment of this application, for ease of description, a low earth orbit satellite communication system whose satellite orbit is 700 km and TA update period is 80 ms and that has a minimum elevation angle of 10 degrees with the terminal is used as an example for description. Herein, the geocentric angle range obtained when the satellite goes over the top of the terminal is used as an example to divide intervals. It is assumed that a radius of a beam cell of the satellite communication system is 100 km. In this case, a corresponding geocentric angle is as follows:

$$\theta = l/R = 0.03136 \text{ rad} = 1.796°$$

where l represents a diameter of the beam cell, and R represents the earth radius.

The corresponding geocentric angle range obtained when the satellite goes over the top of the terminal is [−17.45°, 17.45°]. Therefore, the satellite needs to be divided into at least M=[2×17.45°/1.796°]=20 intervals. A quantity of beam cells obtained after division is M=20, and each beam cell corresponds to different TA compensation information.

Because a TA offset includes a transmission delay TA offset and an update period TA offset, the TA compensation information may include two parts: $\Delta TA_{update}$ and $\Delta TA_{trans}$, or some other reference data that can be used to calculate the two pieces of TA compensation data. When the terminal is located in the beam cell, a TA offset of the terminal is a sum of the transmission delay TA offset and the update period TA offset, and the update period TA offset is a product of a round-trip transmission delay change rate of a current location and current TA update period duration. The TA compensation information may be delivered by the base station, and may have a plurality of indications and representation methods. For example, TA offset compensation information (in a unit of a TA step) of each beam cell may be shown in the following table:

| Beam cell | $|\Delta TA_{max}|$ | $|\Delta TA_{min}|$ | $|\Delta TA_{trans_{max}}|$ | $|\Delta TA_{trans_{min}}|$ |
|---|---|---|---|---|
| 1 | 7.425 | 7.298 | 0.612 | 0.552 |
| 2 | 7.298 | 7.141 | 0.552 | 0.492 |
| 3 | 7.141 | 6.940 | 0.492 | 0.432 |
| 4 | 6.940 | 6.673 | 0.432 | 0.371 |
| 5 | 6.673 | 6.305 | 0.371 | 0.310 |
| 6 | 6.305 | 5.775 | 0.310 | 0.248 |
| 7 | 5.775 | 4.985 | 0.248 | 0.186 |
| 8 | 4.985 | 3.801 | 0.186 | 0.124 |
| 9 | 3.801 | 2.107 | 0.124 | 0.062 |
| 10 | 2.107 | 0 | 0.062 | 0 |
| 11 | 2.107 | 0 | 0.062 | 0 |
| 12 | 3.801 | 2.107 | 0.124 | 0.062 |
| 13 | 4.985 | 3.801 | 0.186 | 0.124 |
| 14 | 5.775 | 4.985 | 0.248 | 0.186 |
| 15 | 6.305 | 5.775 | 0.310 | 0.248 |
| 16 | 6.673 | 6.305 | 0.371 | 0.310 |
| 17 | 6.940 | 6.673 | 0.432 | 0.371 |
| 18 | 7.141 | 6.940 | 0.492 | 0.432 |
| 19 | 7.298 | 7.141 | 0.552 | 0.492 |
| 20 | 7.425 | 7.298 | 0.612 | 0.552 |

It is assumed that the terminal sequentially passes through beam cells 1 to 20 when the satellite goes over the top of the terminal. TA compensation data of the beam cells 1 to 10 and TA compensation data of the beam cells 11 to 20 are symmetric with a sub-satellite point as a center.

As shown in the table, the base station delivers $\{|\Delta TA_{max}|,$ $|\Delta TA_{min}|, |\Delta TA_{trans_{max}}|, |\Delta TA_{trans_{min}}|\}$ as the TA compensation information of each beam cell, where $|\Delta TA_{trans_{max}}|$ represents an absolute value of a maximum offset between the received updated TA value and an actual TA when the terminal in a beam cell just receives the updated TA value delivered by the base station, namely, a maximum transmission delay TA offset; $|\Delta TA_{trans_{min}}|$ represents an absolute value of a minimum offset between the received updated TA value and the actual TA when the terminal in the beam cell just receives the updated TA value delivered by the base station, namely, a minimum transmission delay TA offset; $|\Delta TA_{max}|$ represents an absolute value of a maximum offset between the received updated TA value and the actual TA before the terminal in the beam cell receives a next updated TA value delivered by the base station; and $|\Delta TA_{min}|$ represents an absolute value of a minimum offset between the updated TA value and the actual TA before the terminal in the beam cell receives the next updated TA value delivered by the base station.

Optionally, in addition to the TA compensation information, the base station may further deliver $\{|\Delta TA_{trans_{min}}|,$ $\Delta TA_{trans}', |\Delta TA_{min}|, \Delta TA'\}$ or $\{|\Delta TA_{trans_{max}}|, \Delta TA_{trans}',$ $|\Delta TA_{max}|, \Delta TA'\}$ bound to the beam cell identity used as TA compensation information, where $\Delta TA_{trans}'$ represents a change rate of the TA offset caused by the transmission delay TA offset in the beam cell, and $\Delta TA'$ represents a change rate of a TA offset caused by the transmission delay TA offset and an update period TA offset in the beam cell.

Optionally, the base station may further deliver reference data used to calculate the TA compensation data, where the reference data may include a satellite orbital altitude and geocentric angle data of a current beam cell, and the geocentric angle data includes a maximum geocentric angle and a minimum geocentric angle.

Alternatively, the reference data may include a Doppler frequency offset of the current beam cell, and the Doppler frequency offset includes an absolute value of a maximum Doppler frequency offset and an absolute value of a minimum Doppler frequency offset.

In description of the following calculation process, the satellite orbital altitude is represented by h, the maximum geocentric angle and the minimum geocentric angle of the beam cell are respectively represented by $\{\theta_{max}, \theta_{min}\}$, and the absolute value of the maximum Doppler frequency offset and the absolute value of the minimum Doppler frequency offset of the beam cell are respectively represented by $\{|f_{d_{max}}|, |f_{d_{min}}|\}$.

That the terminal obtains, based on the geocentric angle data and the satellite orbital altitude, a round-trip transmission delay change rate of a location corresponding to the geocentric angle data may be specifically performed according to the following formula:

$$T'_a = \frac{2}{c} \times \frac{\omega R(R+h)\sin\theta}{\sqrt{R^2 + (R+h)^2 - 2R(R+h)\cos\theta}},$$

where $T'_\alpha$ represents the round-trip transmission delay change rate of the location corresponding to the geocentric angle data, c represents the speed of light, ω represents a relative angular velocity between the satellite and a user, R represents the Earth radius, h represents the satellite orbital altitude, and θ represents the geocentric angle data.

Then, that the terminal obtains a transmission delay TA offset based on the round-trip transmission delay change rate and a unidirectional transmission delay between the satellite and the location corresponding to the geocentric angle data may be specifically performed according to the following formula:

$\Delta TA_{trans} = T'_\alpha \times t_{trans}$, where $\Delta TA_{trans}$ represents the transmission delay TA offset, and $t_{trans}$ represents the unidirectional transmission delay between the satellite and the location corresponding to the geocentric angle data.

Alternatively, that the terminal obtains a TA offset based on the round-trip transmission delay change rate, a unidirectional transmission delay between the satellite and the location corresponding to the geocentric angle data, and the current TA update period duration may be specifically performed according to the following formula:

$\Delta TA = T'_\alpha \times (t_{trans} + t_{update})$, where $\Delta TA$ represents the TA offset, and $t_{update}$ represents the current TA update period duration.

A transmission delay TA offset obtained by the terminal based on the maximum geocentric angle in the geocentric angle data is the maximum transmission delay TA offset, a transmission delay TA offset obtained by the terminal based on the minimum geocentric angle in the geocentric angle data is the minimum transmission delay TA offset, a maximum TA offset is a sum of the maximum transmission delay TA offset and a maximum update period TA offset, and a minimum TA offset is a sum of the minimum transmission delay TA offset and a minimum update period TA offset.

Alternatively, that the terminal obtains the round-trip transmission delay change rate of the current location based on the Doppler frequency offset data and a carrier frequency may be specifically performed according to the following formula:

$$T'_\alpha = \frac{2}{f_c} f_d,$$

where $T'_\alpha$ represents the round-trip transmission delay change rate of the location corresponding to the geocentric angle data, $f_c$ represents the carrier frequency, and $f_d$ represents a Doppler frequency offset of the current location.

Then, that the terminal obtains a transmission delay TA offset based on the round-trip transmission delay change rate and a unidirectional transmission delay of the current location may be specifically performed according to the following formula:

$\Delta TA_{trans} = T'_\alpha \times t_{trans}$, where $\Delta TA_{trans}$ represents the transmission delay TA offset, and $t_{trans}$ represents a unidirectional transmission delay between the satellite and the location corresponding to the geocentric angle data.

Alternatively, that the terminal obtains a TA offset based on the round-trip transmission delay change rate, a unidirectional transmission delay of the current location, and the current TA update period duration may be specifically performed according to the following formula:

$\Delta TA = T'_\alpha \times (t_{trans} + t_{update})$, where $\Delta TA$ represents the TA offset, and $t_{update}$ represents the current TA update period duration.

It should be noted that calculation is performed by using the geocentric angle data as an example, or calculation may be performed by using a half-flare angle or a user elevation angle, and the geocentric angle, the half-flare angle, and the user elevation angle data may be obtained through mutual conversion calculation. In addition, the geocentric angle data and the Doppler frequency offset may also be converted and calculated according to the following formula:

$$f_d = \frac{f_c}{c} \times \frac{\omega R(R+h)\sin\theta}{\sqrt{R^2 + (R+h)^2 - 2R(R+h)\cos\theta}},$$

where $f_c$ represents the carrier frequency, $f_d$ represents the Doppler frequency offset of the current location, c represents the speed of light, $\omega$ represents the relative angular velocity between the satellite and the user, R represents the Earth radius, h represents the satellite orbital altitude, and $\theta$ represents the geocentric angle data.

Certainly, the TA compensation information may also be stored on the terminal side. The base station delivers a beam cell identity, for example, 11, and the terminal may obtain TA compensation data through querying. Alternatively, some terminals that have a positioning capability may obtain the foregoing parameter data by themselves to calculate the TA compensation data. This is not limited in this embodiment of this application. When the terminal changes a cell, the terminal may obtain TA compensation information again. The base station may send a plurality of pieces of data to the terminal. When performing compensation, the terminal may select one or more pieces of data to perform compensation based on a requirement. In addition, various types of data in the TA compensation information sent by the base station may be an absolute value, and the terminal may directly use the data; or may send non-absolute value data, and the data is processed by the terminal and then used. This is not limited in this embodiment of this application.

S203: The terminal performs TA compensation in a TA update period based on the updated TA value and the TA compensation information.

After obtaining the TA compensation information, the terminal may perform TA compensation on the received updated TA value based on the TA compensation information. When the terminal is located in the beam cell, the TA offset of the terminal is the sum of the transmission delay TA offset and the update period TA offset, and the update period TA offset is the product of the round-trip transmission delay change rate of the current location and the current TA update period duration, namely, a TA offset $\Delta TA$ between the actual TA between the satellite and the terminal and the TA received by the terminal, where $\Delta TA$ includes a transmission delay TA offset $\Delta TA_{trans}$ and an update period TA offset $\Delta TA_{update}$. For the terminal at a location in the beam cell, when the terminal just obtains the updated TA value delivered by the base station, namely, $\Delta TA = \Delta TA_{trans}$, from a moment at which the terminal just receives the TA value delivered by the satellite to a moment at which the terminal is about to receive the next updated TA value delivered by the base station, namely, in a current TA update period, $\Delta TA_{update}$ gradually increases from 0 to $\Delta TA_{update_{max}}$. At a critical moment at which the terminal is about to receive the next updated TA value delivered by the base station, if the terminal continues to use a latest updated TA value delivered by the base station, a maximum TA offset $\Delta TA = \Delta TA_{trans} + \Delta TA_{update_{max}}$ exists between the actual TA value and the received updated TA value.

Figure 3:
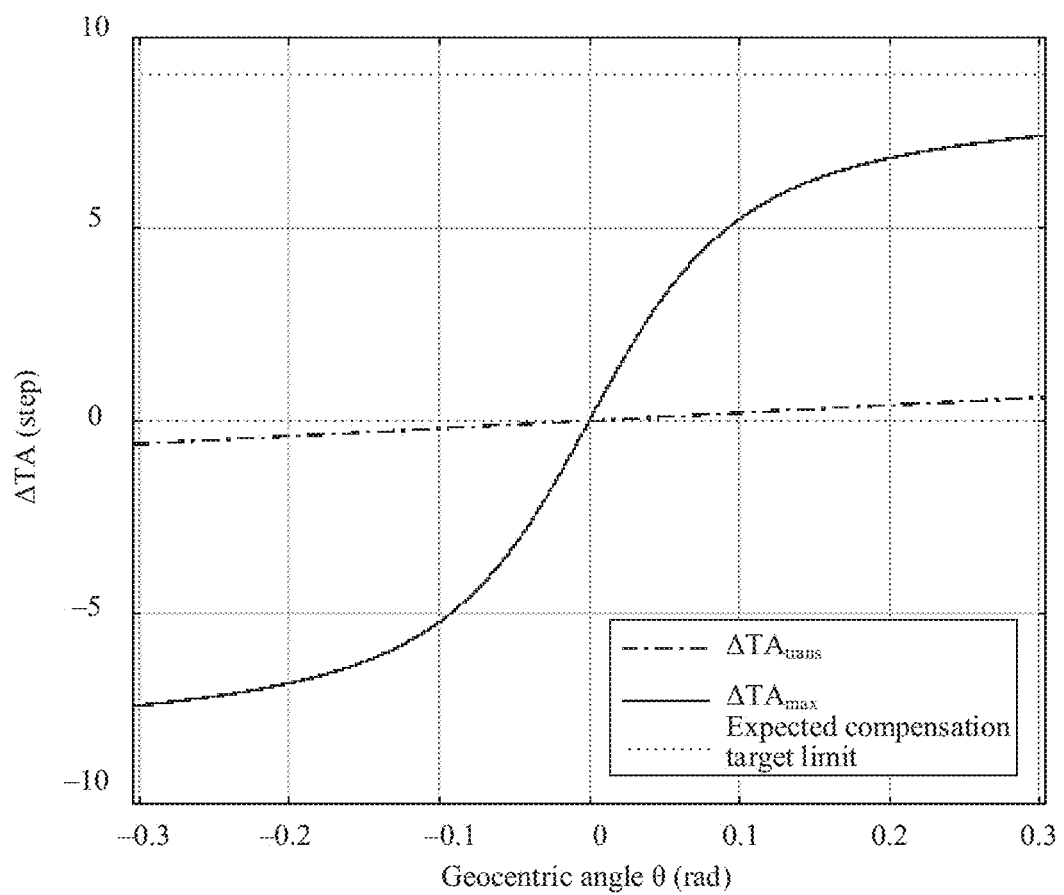
FIG. 3 is a schematic diagram of a change between a maximum TA offset and a transmission delay TA offset according to an embodiment of this application.

FIG. 3 is a schematic diagram of a change between a maximum TA offset and a transmission delay TA offset according to an embodiment of this application. As shown in FIG. 3, a horizontal coordinate is a geocentric angle $\theta$, and a vertical coordinate is a TA offset. A straight line formed by small dots and short line segments is a graph formed when a transmission delay TA offset changes with a change of a geocentric angle, and a real curve is a graph formed when a maximum TA offset at a corresponding location of the geocentric angle changes with a change of the geocentric angle. A maximum TA offset of a determined geocentric angle is a sum of a transmission delay TA offset determined at a location and a maximum update period TA offset at the location. A straight line formed by small dots is an expected compensation target limit. When the geocentric angle changes from −0.3 to 0, a maximum negative TA offset and a maximum negative transmission delay TA offset exist when the terminal first sees the satellite. As the satellite approaches the terminal, the TA offset and the transmission delay TA offset gradually decrease. After the satellite goes over the top of the terminal, the TA offset is positive and gradually increases, and the transmission delay TA offset is also positive and gradually increases. It can be learned that the change of the TA offset may be regular. Therefore, the terminal may compensate for the TA offset according to these laws. A principle of TA offset pre-compensation may be as follows: To prevent uplink data from generating inter-symbol interference, a TA value obtained after autonomous compensation performed by the terminal does not exceed a short CP range specified in a frame structure, and is a positive TA value that is as close to an actual value as possible.

Therefore, according to the foregoing compensation principle, the terminal may self-compensate for, within two TA update intervals, the updated TA value delivered by the base station by using $\Delta TA_{trans}$ and $\Delta TA$ information bound to the beam cell identity. When the terminal and the satellite are close to each other, $|\Delta TA_{max}|$ or a value of $|\Delta TA_{max}|$ obtained through calculation based on the reference data may be selected as a uniform TA offset compensation value in the beam cell. When the terminal and the satellite are far away from each other, $-|\Delta TA_{trans_{min}}|$ or a negative value of $|\Delta TA_{min}|$ obtained through calculation based on the reference data may be selected as a unified TA offset compensation value in the beam cell.

S204: The terminal sends uplink data by using a TA value obtained after TA compensation is performed.

After the TA update period expires, the terminal may again receive a new updated TA value sent by the base station according to the TA update period.

In this embodiment, the terminal receives the updated TA value and the beam cell identity that are sent by the base station, and obtains the TA compensation information based on the beam cell identity, so that self-compensation can be performed on the updated TA value in the TA update period, thereby increasing a TA update frequency. Impact on uplink data receiving performance caused by a rapid change of TA in the satellite communication system, for example, inter-user interference caused by a TA offset and impact on decoding performance, is reduced. This avoids a limitation that the base station cannot frequently deliver the TA update information to the terminal due to resource and overhead limitations, and further avoids impact caused by an update period TA offset generated in the TA update period, thereby improving working performance and efficiency of the satellite communication system.

Figure 4:
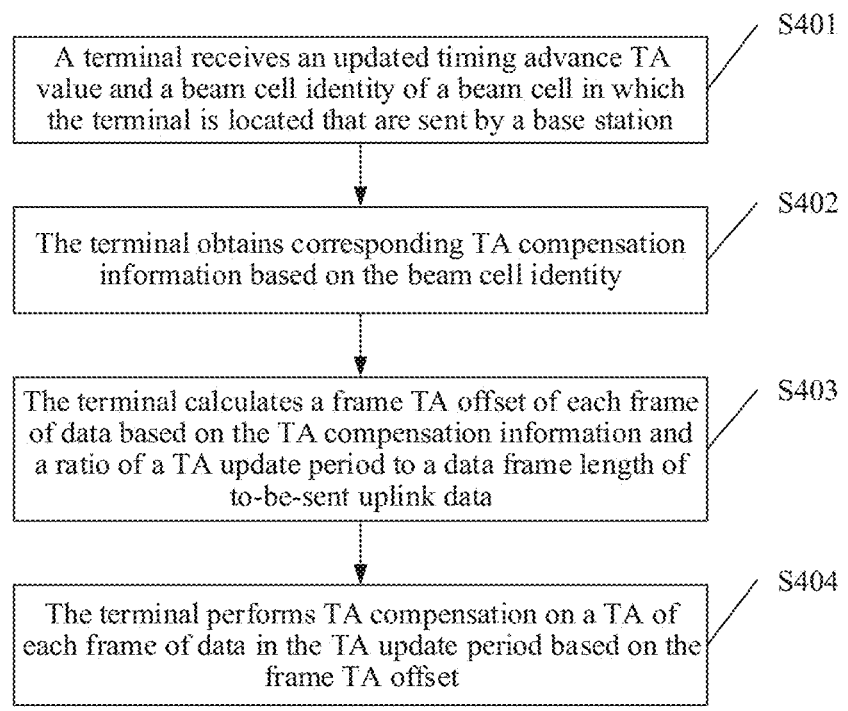
FIG. 4 is a schematic flowchart of another timing advance update method according to an embodiment of this application.

FIG. 4 is a schematic flowchart of another timing advance update method according to an embodiment of this application. In this embodiment, a time granularity is used for differentiation, and TA compensation is separately performed on uplink data sent in a beam cell based on different data frames, to improve compensation precision. In this case, TA compensation data obtained by a terminal includes a maximum TA offset, a minimum TA offset, a maximum transmission delay TA offset, and a minimum transmission delay TA offset of a current beam cell. Steps S401 and S402 are the same as steps S201 and S202, and the method further includes the following steps.

S403: The terminal calculates a frame TA offset of each frame of data based on the TA compensation information and a ratio of a TA update period to a data frame length of to-be-sent uplink data.

S404: The terminal performs TA compensation on a TA of each frame of data in the TA update period based on the frame TA offset.

When the terminal just receives a delivered updated TA value and the terminal receives a next updated TA value delivered by the base station, a TA offset changes $\Delta TA_{trans}$ from to $\Delta TA$. During this period, a round-trip transmission delay change rate is almost unchanged, and it may be considered that a change from $\Delta TA_{trans}$ to $\Delta TA$ in the update period may be linear. Therefore, the TA update period may be divided into smaller time granularities, and the terminal autonomously compensates for, by using the divided time granularity as a unit, the updated TA value delivered by the base station. For example, the TA update period of the base station is 10×N ms, and the terminal may update, at a time interval of a data frame length, namely, 10 ms, the TA used for autonomous compensation.

When the terminal and a satellite are close to each other, that the terminal calculates a frame TA offset of each frame of data based on the TA compensation information and a ratio of a TA update period to a data frame length may specifically include: The terminal calculates the frame TA offset based on the maximum TA offset, the maximum transmission delay TA offset, and the ratio of the TA update period to the data frame length. It is assumed that $\Delta TA_{frame} = (|\Delta TA_{max}| - |\Delta TA_{trans_{max}}|)/N$ is used as the frame TA offset of each frame. The terminal just receives a first frame of data after delivering the updated TA value and selects $|\Delta TA_{trans_{max}}| + \Delta TA_{frame}$ as an offset compensation value; receives a second frame of data after delivering the updated TA value and selects $|\Delta TA_{trans_{max}}| + 2\Delta TA_{frame}$ as an offset compensation value, . . . ; and receives an $N^{th}$ frame of data before receiving the next updated TA value and selects $|\Delta TA_{trans_{max}}| + N\Delta TA_{frame}$ as an offset compensation value. N is a sequence number of a data frame, and N is an integer greater than or equal to 1.

When the terminal and the satellite are far away from each other, that the terminal calculates a frame TA offset of each frame of data based on the TA compensation information and a ratio of a TA update period to a data frame length may specifically include: The terminal calculates the frame TA offset based on the minimum TA offset, the minimum transmission delay TA offset, and the ratio of the TA update period to the length of the data frame of the to-be-sent uplink data. It is assumed that $\Delta TA_{frame} = (|\Delta TA_{min}| - |\Delta TA_{trans_{min}}|)/N$ is used as the frame TA offset of each frame. The terminal just receives a first frame of data after delivering the updated TA value and selects $-|\Delta TA_{trans_{min}}|$ as an offset compensation value, receives a second frame after delivering the updated TA value and selects $-|\Delta TA_{trans_{min}}| - \Delta TA_{frame}$ as an offset compensation value, . . . ; and receives an $N^{th}$ frame of data before receiving the next updated TA value and selects $-|\Delta TA_{trans_{min}}| - (N-1)\Delta TA_{frame}$ an offset compensation value. N is a sequence number of a data frame, and N is an integer greater than or equal to 1.

It should be noted that the TA compensation data described above may also be obtained through calculation by using the reference data in the embodiment shown in FIG. 2, and details are not described herein again.

In this embodiment of this application, the terminal autonomously compensates for, in a unit of a smaller time granularity, the updated TA value delivered by the base station in the TA update period. In this way, precision of TA compensation can be improved, an offset between the TA used by the terminal and an actual TA can be further reduced, and inter-user interference caused by the TA offset and impact on decoding performance are avoided.

Figure 5:
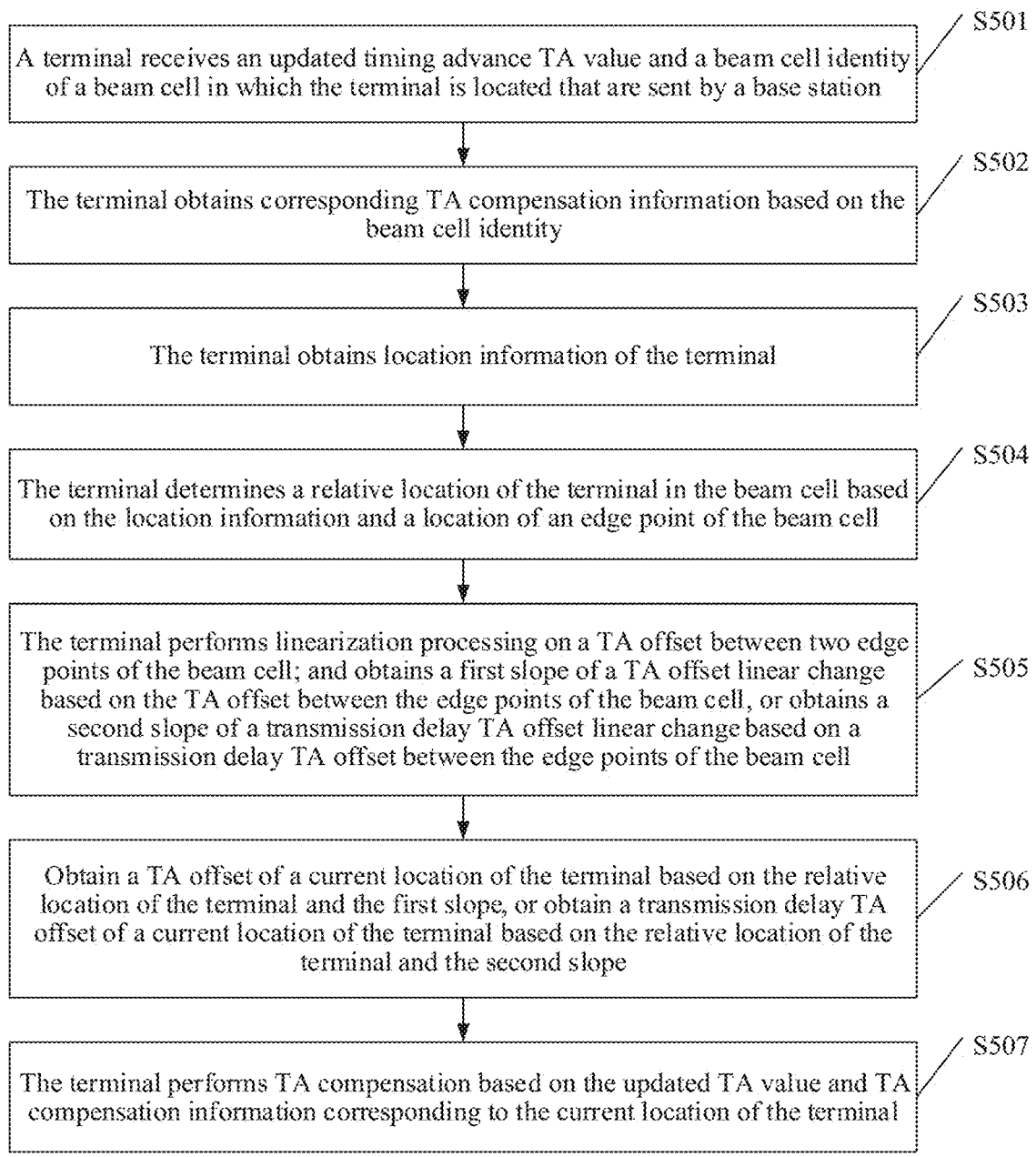
FIG. 5 is a schematic flowchart of still another timing advance update method according to an embodiment of this application.

FIG. 5 is a schematic flowchart of still another timing advance update method according to an embodiment of this application. In this embodiment, a terminal may further perform TA compensation with high precision based on location information of the terminal. Steps S501 and S502 are the same as steps S401 and S402, and after S502, the method further includes the following steps.

S503: The terminal obtains the location information of the terminal.

Optionally, the terminal may obtain the location information of the terminal through Doppler frequency offset measurement or in another positioning manner.

S504: The terminal determines a relative location of the terminal in the beam cell based on the location information and a location of an edge point of the beam cell.

After the beam cell is determined based on a beam cell identity, the location of the edge point of the beam cell may be obtained. Then, the relative location of the terminal in the beam cell may be learned with reference to the location information of the terminal.

S505: The terminal performs linearization processing on a TA offset between two edge points of the beam cell; and obtains a first slope of a TA offset linear change based on the TA offset between the edge points of the beam cell, or obtains a second slope of a transmission delay TA offset linear change based on a transmission delay TA offset between the edge points of the beam cell.

After obtaining TA compensation data in the TA compensation information based on the beam cell identity, the terminal may obtain the TA offset and the transmission delay TA offset of the edge point. Then, the first slope of the TA offset linear change or the second slope of the transmission delay TA offset linear change that needs to be obtained may be obtained based on parameters of two edge points.

S506: Obtain a TA offset of a current location of the terminal based on the relative location of the terminal and the first slope, or obtain a transmission delay TA offset of a current location of the terminal based on the relative location of the terminal and the second slope.

With reference to the relative location of the terminal and the edge point and the obtained first slope or the obtained second slope, the TA offset and the transmission delay TA offset of the current location of the terminal may be obtained through mapping. That is, more accurate TA compensation information corresponding to the current location of the terminal is obtained.

S507: The terminal performs TA compensation based on the updated TA value and the TA compensation information corresponding to the current location of the terminal.

Optionally, when the terminal and a satellite are close to each other, the terminal adds the updated TA value and an absolute value of the TA offset of the current location of the terminal to perform TA compensation.

When the terminal and the satellite are far away from each other, the terminal subtracts an absolute value of the transmission delay TA offset of the current location of the terminal from the updated TA value to perform TA compensation.

It should be noted that the TA compensation data described above may also be obtained through calculation by using the reference data in the embodiment shown in FIG. 2, and details are not described herein again.

Optionally, to reduce signaling overheads, an edge cell whose TA offset change is relatively small max-transmit only $\{|\Delta TA_{max}|, |\Delta TA_{trans_{max}}|\}$, $\{|\Delta TA_{min}|, |\Delta TA_{trans_{min}}|\}$, or an average value of $\{|\Delta TA_{max}|, |\Delta TA_{trans_{max}}|\}$ and $\{|\Delta TA_{min}|, |\Delta TA_{trans_{min}}|\}$. For a manner of sending the reference data, only $\{h, \theta_{max}\}$, $\{h, \theta_{min}\}$, or $\{h, (\theta_{max}+\theta_{min})/2\}$ may be sent; or only $\{h, |f_{d_{max}}|\}$, $\{h, |f_{d_{min}}|\}$, or $\{h, (|f_{d_{max}}|+|f_{d_{min}}|)/2\}$ may be sent.

A TA offset of a beam cell close to a sub-satellite point changes much faster than that of an edge cell. A base station may send $\{|\Delta TA_{max}|, |\Delta TA_{min}|, |\Delta TA_{trans_{max}}|, |\Delta TA_{trans_{min}}|\}$ or equivalent $\{h, \theta_{max}, \theta_{min}\}$ or $\{h, |f_{d_{max}}|, |f_{d_{min}}|\}$ information to the terminal, and the terminal may estimate a location of the terminal through Doppler measurement or in another manner. These beam cells have large Doppler change rates and high signal to noise ratios (Signal to Noise Ratio, SNR for short), and have relatively accurate location information.

In this embodiment of this application, the terminal first obtains the location information of the terminal in the beam cell in a TA update period, may obtain TA compensation data with high precision that is corresponding to the current location by using the location information and known TA compensation information. Further, autonomously compensating the updated TA value delivered by the base station can further improve TA compensation precision, reduce the offset between the TA used by the terminal and the actual TA, and avoid inter-user interference caused by the TA offset and impact on decoding performance.

It should be noted that, in this embodiment of this application, with reference to the method in FIG. 4, the terminal may further divide a change from $|\Delta TA_{trans}|$ to $|\Delta TA|$ in terms of time in the update period, and calculate a real-time TA offset compensation value, thereby further improving TA offset compensation precision.

In addition, for the updated TA value sent by the base station, because the base station may obtain an accurate TA of the terminal at a current moment and a round-trip transmission delay change rate, and determine that a relative motion manner of the base station is close to or away from the terminal, the base station can calculate ΔTAtrans at the current moment, and deliver the updated TA value after compensation is performed on an offset caused by a transmission delay. In other words, the updated TA value sent by the base station is an updated TA value sent by the base station after compensation is performed based on a transmission delay TA offset at the current moment. Because the base station has performed pre-compensation processing on the sent updated TA value, the offset between the received TA of the terminal and the actual TA in the TA update period changes from 0 to $|\Delta TA| - |\Delta TA_{trans}|$. In this case, the updated TA value may be combined with the methods in the embodiments shown in FIG. 2 to FIG. 5, so that precision of TA offset compensation performed by the terminal in the TA update period can be further improved.

This embodiment of this application provides a terminal that estimates, in the TA update period, a change rate of the terminal based on a common TA change rate indicated by a network device and the received TA value, and compensates for the received TA value by using an estimated value of the change rate of the terminal.

The network device indicates a TA change rate of a reference location in a coverage area as a common TA change rate uniformly configured in the area, and delivers the TA change rate to all terminals or a group of terminals in the coverage area. During initial access, the terminal compensates for, by using the common TA change rate, a previously received TA value in a period in which the network device delivers the updated TA value. Optionally, the terminal subsequently adjusts the common TA change rate based on received TA values of a plurality of TA commands, to obtain a TA change rate actually used for compensation. The TA change rale is used to compensate for a TA value.

Optionally, the coverage area refers a plurality of coverage areas obtained after an entire coverage area of the network device is divided based on to a parameter (for example, an angle, a time, or a projection size of the corresponding ground), and each coverage area may be one cell. For example, a range of a satellite cell generally corresponds to projection of a satellite beam on the ground. Each coverage area may alternatively include a plurality of satellite beams or a plurality of cells, or include only some areas in one satellite beam. Each coverage area may also correspond to one terminal or a group of terminals.

In this embodiment of this application, there may be one or more common TA change rates. If there is one common TA change rate, the common TA change rate corresponds to a change rate of a reference location in a coverage area. If there are a plurality of common TA change rates, each of the plurality of common TA change rates corresponds to a change rate of a different reference location in a coverage area. It should be understood that the TA change rate is variable, and may be dynamically adjusted by the network device. It should be understood that the common TA change rate in this embodiment of this application may alternatively be an offset of a change rate of a corresponding reference location. It should be understood that, used as a common TA change rate of a current coverage area, the reference location may be a center point of the coverage area, an edge point of the coverage area, or another specified location. This is not limited in this application.

Optionally, because the TA change rate is a Doppler frequency offset, or a value related to information about an angle, for example, an elevation angle, a flare angle, or a geocentric angle between the terminal and the satellite, when the terminal receives a plurality of common TA change rates, the terminal may further select a corresponding common TA change rate based on information such as the Doppler frequency offset and a relative angle indicated by the network device or measured by the terminal.

It may be understood that the TA change rate in this embodiment of this application may be a TA change rate, a value obtained by multiplying the TA change rate by a unit step (or referred to as a scaling coefficient) (for example, half of the TA change rate may represent a downlink transmission timing change rate of a user), or by equivalent information that can be converted to the TA change rate (for example, the Doppler frequency offset, or the information about the angle including the elevation angle, the flare angle, and or the geocentric angle between the terminal and the satellite). It should be understood that the equivalent information herein may be indicated by the network device, or may be measured by the terminal; or may be a TA variation converted based on the TA change rate in a unit time. The unit time of the TA variation may be a value agreed upon by a network side and the terminal in advance (for example, specified in a protocol), may be directly indicated by the network device, or indirectly indicated by the network device. For example, a timeout time of an uplink time alignment timer (time Alignment Timer) is used as the unit time. For another example, the unit time of the TA variation is indirectly indicated based on a unit schedule table agreed between the network and the terminal shown in Table 1. The network device sends indication information (index) based on a generation table.

TABLE 1

| Indication information | Unit time length |
|---|---|
| 0 | t0 |
| 1 | t1 |
| ... | ... |
| n | tn |

It may be understood that the unit time in this embodiment of this application may be unified configuration by using the network device as a unit, may be independent configuration of a single or a plurality of coverage areas, or may be specified configuration of one or a group of terminals. The unit time may be bound to the TA change rate for indication, or may be independently indicated.

In this embodiment of this application, the common TA change rate or other information is delivered in one or more of an SIB, RRC, DCI, or a MIB. Optionally, the common TA change rate may be sent together with the TA value or separately sent. A sending period of the common TA change rate may also be the same as or different from a sending period of the TA value.

For example, the common TA change rate is indicated in broadcast information. The following uses a manner in which the common TA change rate is indicated in an SIB 1 as an example:

```
RACH-ConfigCommon ::=          SEQUENCE {
   rach-ConfigGeneric              RACH-ConfigGeneric,
   totalNumberOfRA-Preambles       INTEGER (1..63)
   ...                             OPTIONAL, -- Need S
   CommonTArate                    CommonTArate
}
```

It may be understood that, in this embodiment of this application, the TA change rate may be in a form of a new field, or an original field may be reused.

The TA change rate in this embodiment of this application may be directly indicated by the network device, or may be indicated by using indication information. There is a correspondence between the indication information and the TA change rate, for example, as shown described in Table 2.

TABLE 2

| Indication information (index) | TA change rate |
|---|---|
| 0 | CommonRate0 |
| 1 | CommonRate1 |
| ... | ... |
| n | CommonRaten |

It should be understood that Table 2 is merely an example, and the correspondence between the indication information and the TA change rate may be presented in another manner. This is not limited in this application. Optionally, the indication information may alternatively correspond to a coverage area (for example, correspond to a sequence number of the coverage area). Optionally, the indication information may alternatively correspond to a reference location of each coverage area. In this case, the TA change rate may be a change rate or an offset of the reference location, for example, as shown in Table 3.

TABLE 3

| Indication information (index) | Coverage area | Reference location | TA change rate |
|---|---|---|---|
| 0 | ID0 | 0 | CommonRate0,0 |
|   |     | 1 | CommonRate0,1 |
|   |     | ... | ... |
| 1 | ID1 | 0 | CommonRate1,0 |
|   |     | 1 | CommonRate1,1 |
|   |     | ... | ... |
| ... | ... | ... | ... |
| n | IDn | 0 | CommonRaten,0 |
|   |     | 1 | CommonRaten,1 |
|   |     | ... | ... |

It may be understood that the table may be an agreement table (for example, a protocol agreement), or may be delivered by the network device.

Optionally, when the indication information indicates the TA change rate or the offset, the unit step may be combined. In this case, there is a correspondence between the indication information and the unit step. Details are shown in Table 4.

TABLE 4

| Indication information (index) | Unit step |
|---|---|
| 0 | step0 |
| 1 | step1 |
| ... | ... |
| n | stepn |

Optionally, the indication information may further indicate a value in a value interval. For example, if a determined TA change rate is 1.463, and an interval of the TA change rate is between 1 and 2, both are indicated as a reference value (for example, 1.5). A specific correspondence may be shown in Table 5.

TABLE 5

| Indication information (index) | Value interval | TA change rate |
|---|---|---|
| 0 | 1 to 2 | CommonRate0 |
| 1 | 2 to 3 | CommonRate1 |
| ... | ... | ... |
| n | n − 1 to n | CommonRaten |

The value interval may be determined by a satellite system parameter. For example, the value interval may be determined based on factors such as a change range of the TA change rate, precision, or network overheads. Alternatively, the value interval may be divided into a specific quantity of intervals at equal intervals or unequal intervals, and each index number corresponds to a reference value (fixed value) in a value interval.

Optionally, an example in which the value interval is divided at the unequal intervals is disclosed. A TA change rate in a coverage area of a single satellite is S-shaped. If a reachable range of the TA change rate is considered to be divided based on a coverage area under a specific satellite, value interval division at an edge coverage of a satellite is more dense. Division into value intervals near the sub-satellite point is sparse.

It may be understood that, in the foregoing indication information manner, indicated bit overheads can be reduced, and network resources can be saved.

The foregoing methods in the embodiments of this application are both applicable to a satellite regeneration scenario and a satellite transparent transmission scenario. The following specifically describes the two scenarios and relationships between the scenarios and the common TA change rate.

For the satellite regeneration scenario, if impact of a satellite orbit error and a terminal altitude is not considered, a TA change rate of each location in a satellite coverage area of the satellite does not change with time. In this case, the common TA change rate does not have time variability, and various direct and indirect indications of the network device do not need to be updated with time. It may be understood that the terminal only needs to receive the common TA change rate once, and subsequently keeps compensating for the TA value based on this TA change rate. If the impact of the satellite orbit error and the terminal altitude is considered, the TA change rate of each location in the satellite coverage area of the satellite changes with time. Therefore, the common TA change rate needs to be continuously indicated directly or indirectly.

For the satellite transparent transmission scenario, because a distance between the satellite and a ground station changes with time, the TA change rate of each location in the sub-satellite coverage area changes in real time. The TA change rate is associated with the following variables:

$$D' = (D_1 + D_2)' \sim TA' = (TA_1 + TA_2)' \sim \left(\frac{f_{d1}}{f_{c1}} + \frac{f_{d2}}{f_{c2}}\right) \sim (F(\theta_1) + F(\theta_2))$$

In the satellite transparent transmission scenario, a TA change rate of the terminal includes two parts. One part of the TA change rate is a TA change rate $TA'_1$ of a user link (a link between the terminal and the satellite), and the other part of the TA change rate is a TA change rate of $TA'_2$ of a feed link (a link between the satellite and the base station). The TA change rate is further related to a sum of ratios of Doppler frequency offsets $f_d$ of the user link and the feed link to center frequencies $f_c$. The TA change rate is also a function of angular information $\theta_1$ and $\theta_2$ between the satellite and the terminal and the ground station.

It may be understood that, with reference to the satellite regeneration scenario, in the satellite transparent transmission scenario, a part of the TA change rate may change with time, and the other part of the TA change rate may not change with time. In this case, manners of indicating the two parts of the TA change rate by the network device may be different or the same. The terminal may obtain the two parts of the TA change rate in different manners or in a same manner. Specifically, factors such as a relationship between the satellite, the base station, and the terminal, and a current network status may be considered.

It should be noted that, in the following descriptions of a specific TA change rate, for various indication manners and related concepts, refer to descriptions of the common TA change rate. Descriptions related to the specific TA change rate may also be applied to various indications and related descriptions of the common TA change rate.

In this embodiment of this application, the network device sends a TA update command (sends the TA value) according to a specific period. The network device may further indicate the specific TA change rate of the terminal. The terminal compensates for the received TA value in the TA update period based on the specific TA change rate indicated by the network device.

Optionally, after the terminal accesses a network, the network device delivers the TA update command and indicates the specific TA change rate of the terminal according to the specific period. The terminal compensates for the previously received TA value in the TA update period by using a currently received specific TA change rate. Optionally, the specific TA change rate does not change very quickly. In addition, reduction of signaling overheads may further be considered, and the network device may deliver the specific TA change rate at a millisecond or second level.

It may be understood that the common TA change rate may be periodically broadcast. Each terminal may have a different specific TA change rate. Therefore, different sending frequencies may be used, to be specific, a specific TA change rate of each terminal may be different. For example, a sending frequency with a small change is low, and a sending frequency with a large change is high. The specific TA change rate may be sent directionally. Certainly, different specific TA change rates may alternatively be sent at a same frequency. In addition, a sending period of the common TA change rate and a sending period of the specific TA change rate may also be the same.

Similar to the common TA change rate, in this embodiment of this application, the network device indicates the specific TA change rate according to the specific period. The specific TA change rate may be a complete value of the specific TA change rate, indicate a difference between the specific TA change rate and the common TA change rate, or indicate a difference between a current specific TA change rate and a previously delivered specific TA change rate. If the common TA change rate is used for indication, explanations about a corresponding coverage area definition, a quantity of common TA change rates, an indication variable, an indication location, and an indication manner are the same as those described in the foregoing embodiments.

In this embodiment of this application, the specific TA change rate indicated by the network device may be a specific TA change rate for a single terminal, or may be a specific TA change rate for a group of terminals. Groups of terminals are generally located in close geographical locations.

The specific TA change rate indicated by the network device in this embodiment of this application may be a value of the specific TA change rate, a value obtained after the specific TA change rate is multiplied by a unit step (or referred to as a scaling coefficient), equivalent information that can be converted to the specific TA change rate, or a TA variation converted based on the TA change rate in a unit time. In this embodiment of this application, the specific TA change rate or other related information indicated by the network device may be carried in a system information block (System Information Block, SIB), a radio resource control (Radio Resource Control, RRC) protocol, downlink control information (Downlink Control Information, DCI), or a timing advance command (Timing Advance Command, TAC); and be sent on a physical downlink shared channel (Physical Downlink Shared Channel, PDSCH) together with downlink data. Alternatively, the specific TA change rate or other related information that is sent on a separately allocated PDSCH may be independently indicated, or may be indicated by being bound to the TA update command.

It may be understood that same as the foregoing description, sending may be performed by adding a field, reusing an original field, or the like.

In this embodiment of this application, the specific TA change rate indicated by the network device may be directly indicated, or may be indicated by using indication information Table 6 shows an example.

TABLE 6

| Indication information (index) | Specific TA change rate |
|---|---|
| 0 | SpecificRate0 |
| 1 | SpecificRate1 |
| ... | ... |
| n | SpecificRaten |

It may be understood that the indication information may alternatively indicate an offset. The unit step may further be combined for indication. In this case, the network device may agree with the terminal to send unit step indication information or directly send unit step indication information. For details, refer to Table 4.

Optionally, the indication information may further indicate a value in a value interval (for details, refer to Table 5). When value intervals are divided, the value intervals may be uniformly planned based on all coverage areas of the satellite, or separately configured based on different coverage areas. After the network device determines a variable, for example, the specific TA change rate or other information to be indicated, the value interval is limited by a maximum range of the indication variable, or by a specific offset range based on a reference value. Factors such as a range, precision, or overheads of the variable are considered. A range of the variable may be divided into a specific quantity of intervals at equal or non-equal intervals, and each piece of indication information corresponds to a value in a value interval.

Optionally, in this embodiment of this application, a form of periodically indicating the specific TA change rate is configurable. Differences between specific TA change rates in some coverage areas are relatively small, and the network device does not need to periodically indicate the specific TA change rates to the terminal in these coverage areas. In this case, a flag, for example, SpecificTARateIndicateFlag, may be added to indicate whether the specific TA change rate needs to be periodically delivered. A manner in which the flag is indicated in the SIB 1 is used as an example:

| | |
|---|---|
| RACH-ConfigCommon ::= | SEQUENCE { |
| rach-ConfigGeneric | RACH-ConfigGeneric, |
| totalNumberOfRA-Preambles | INTEGER (1..63) OPTIONAL, |
| ... | -- Need S |
| SpecificTARateIndicateFlag | SpecificTARateIndicateFlag |
| } | |

It may be understood that if the flag indicates that the specific TA change rate does not need to be periodically delivered, there is only one specific TA change rate in the coverage area. In this case, the specific TA change rate is similar to the common TA change rate.

The foregoing specific TA change rate may also be applicable to the satellite regeneration scenario and the satellite transparent transmission scenario.

For the satellite regeneration scenario, the network device may directly or indirectly indicate the specific TA change rate in different forms in the foregoing manners in this embodiment. If the common TA change rate needs to be used, for an indication of the common TA change rate, refer to the foregoing description about the common TA change rate.

For the satellite transparent transmission scenario, a specific TA change rate at each location in the satellite coverage area of the satellite changes in real time. Optionally, in the satellite transparent transmission scenario, the base station may directly or indirectly indicate the specific TA change rate (herein, the specific TA change rate is a specific TA change rate for an entire link). The base station may directly indicate the specific TA change rate, or indicate Doppler frequency offset information $\{f_{d1}, f_{d2}, f_{c2}\}$, or indicate angle information $\{\theta_1, \theta_2\}$ between the satellite and the terminal and the ground station, or indicate a TA variation in a unit time. Optionally, in the satellite transparent transmission scenario, another method for the base station to indicate the specific TA change rate is that the user link continues to use the foregoing satellite regeneration scenario indication solution, and the TA change rate of the feed link is automatically calculated by the terminal based on relative location information between the ground station (the base station) and the satellite. The relative location information may not need to be sent in real time, but only needs to be sent once at a moment, or the relative location information needs to be periodically updated.

Optionally, the ground station (base station) knows geographical location information of the ground station, and may obtain a satellite ephemeris and a real-time orbit location of the satellite. If the ground station (base station)

delivers the relative location information between the ground station (base station) and the satellite to the terminal, the terminal may automatically calculate the TA change rate of the feed link by using the relative location information between the ground station (base station) and the satellite.

Figure 14:
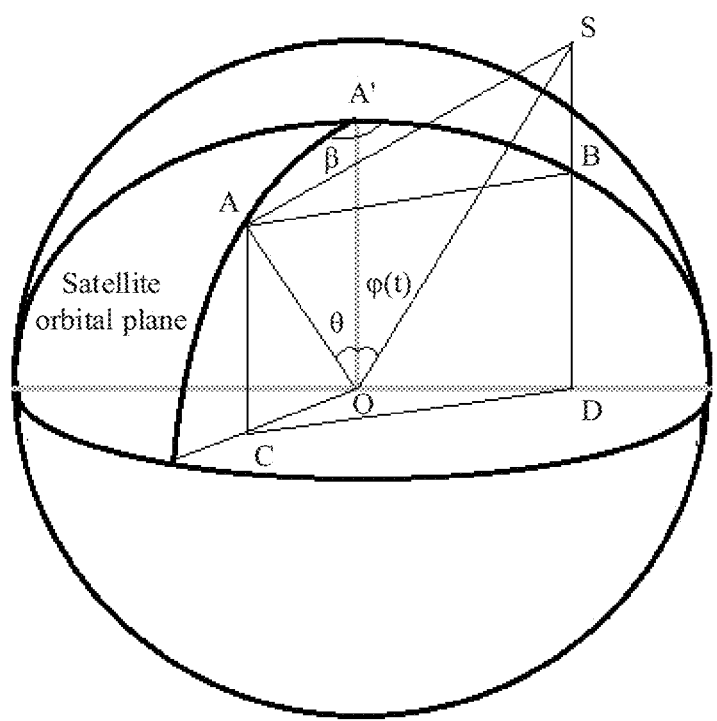
FIG. 14 is a schematic diagram of a geometric relationship between a satellite and a ground station (base station) according to an embodiment of this application.

As shown in FIG. 14, the terminal may calculate the TA change rate of the feed link by using the relative location information between the ground station and the satellite. In FIG. 14, a vertical plane is a satellite orbital plane, O indicates an earth center, S indicates a satellite whose orbit is a circular orbit, R is a distance between the earth center and the satellite orbit, r is the earth radius, A is a ground station, and an artificially determined reference point A' is introduced. A' is a point at which the ground station A is projected on the Earth's surface from the satellite orbit plane. A relationship between the ground station A and the reference point A' may be expressed in by angles β and θ, where β is a plane included angle (namely, an included angle between a plane OAA' and the satellite orbital plane), θ is a projection angle of an orbital plane of the ground station A (namely, an included angle ∠AOA' between OA and OA'), and an angle parameter may also be equivalently represented by an arc length $l_{AA'}=\theta r$. A geocentric angle between the satellite S and the reference point A' at a current t moment is represented by $\phi(t)=\omega t$, where ω represents a relative angular velocity between the satellite S and the reference point A', the angle parameter may also be equivalently represented by an arc length $l_{SA}=\phi(t)r$, and S' is a focal point of a connection line between the satellite S and an Earth's core O and projection of the satellite orbital plane on the Earth's surface. The three pieces of angle information {β,θ, ϕ(t)} or equivalent information are used to express relative locations of the ground station A and the satellite S. C and D are projection of the ground station A and the satellite S on a plane perpendicular to the satellite orbital plane, respectively.

At a moment $t_0$, the ground station sends the following information to the terminal: the plane included angle β, an orbital plane projection angle θ of A, information about a corresponding geocentric angle $\phi(t_0)=\omega t_0$ or equivalent arc length between the satellite S and the projection reference point A' at the moment $t_0$, and a relative motion direction of S and A'. It may be understood that these parameters may be more or less provided that the TA change rate of the feed link can be calculated according to a formula agreed in advance. Optionally, these parameters need to be notified only once at the moment $t_0$, and the terminal may automatically calculate the TA change rate of the feed link part according to the agreed formula.

The following is an example of a calculation formula based on known conditions:

$$AC = r\cos\theta, \ OC = r\sin\theta$$

$$SD = R\cos\phi(t), \ OD = R\sin\phi(t)$$

Because $\triangle SAB$ is a right triangle, $SA^2 = AB^2 + SB^2$:

$$AB^2 = CD^2 = OC^2 + OD^2 - 2OC \cdot OD\cos\angle COD$$
$$= r^2\sin^2\theta + R^2\sin^2\phi(t) - 2Rr\sin\theta\sin\phi(t)\cos\beta$$

$$SB^2 = (SD - BD)^2 = (SD - AC)^2 = (R\cos\phi(t) - r\cos\theta)^2$$

$$\Rightarrow SA^2 = R^2 + r^2 - 2Rr[\sin\theta\cos\beta\sin\phi(t) + \cos\theta\cos\phi(t)], \ \phi(t) = \omega t$$

-continued $$\Rightarrow l(t) = SA = \sqrt{R^2 + r^2 - 2Rr[\sin\theta\cos\beta\sin(\omega t) + \cos\theta\cos(\omega t)]}$$

$$\Rightarrow l(t)' = \frac{-\omega r R[\sin\theta\cos\beta\cos(\omega t) - \cos\theta\sin(\omega t)]}{\sqrt{R^2 + r^2 - 2Rr[\sin\theta\cos\beta\sin(\omega t) + \cos\theta\cos(\omega t)]}}$$

It should be noted that, the foregoing method is used to indicate the TA change rate of the user link and the TA change rate of the feed link in segments. To ensure consistency of a protocol design, information indication formats of the satellite regeneration scenario and the satellite transparent transmission scenario may be designed in a unified manner. Because indication information of a feed link segment is valid only for the satellite transparent transmission scenario, a flag, for example, TransparentIndicateFlag, may be added to indicate whether the indication information of the feed link segment is valid. Alternatively, some indication parameters of the feed link segment may be set to specific preset values, to indicate that feed link segment information is invalid. For example, angle information used in the foregoing calculation formula is set to a value that does not belong to [−π, π], to indicate that the angle information is invalid.

Figure 6:
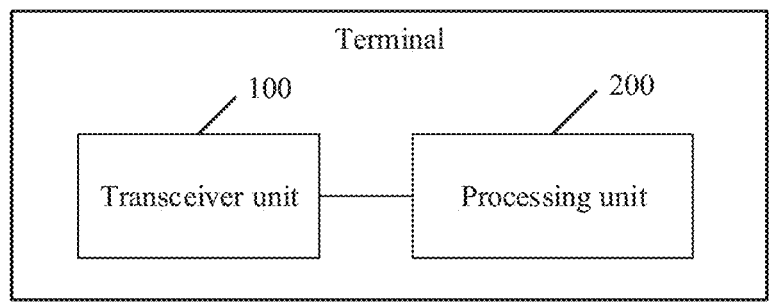
FIG. 6 is a schematic composition diagram of a terminal according to an embodiment of this application.

FIG. 6 is a schematic composition diagram of a terminal according to an embodiment of this application. The terminal may include:

a transceiver unit 100, configured to receive an updated timing advance TA value and a beam cell identity of a beam cell in which the terminal is located that are sent by a base station; and a processing unit 200, configured to obtain corresponding TA compensation information based on the beam cell identity, and perform TA compensation in a TA update period based on the updated TA value and the TA compensation information; where the transceiver unit 100 is further configured to send uplink data by using a TA value obtained after TA compensation is performed.

Optionally, when the terminal is located in the beam cell, a TA offset of the terminal is a sum of a transmission delay TA offset and an update period TA offset, and the update period TA offset is a product of a round-trip transmission delay change rate of a current location and current TA update period duration;

the TA compensation information includes TA compensation data or reference data used to obtain the TA compensation data;

the TA compensation data includes a maximum TA offset and a minimum transmission delay TA offset of a current beam cell; and the reference data includes a satellite orbital altitude and geocentric angle data of the current beam cell, where the geocentric angle data includes a maximum geocentric angle and a minimum geocentric angle; or the reference data includes a Doppler frequency offset of the current beam cell, where the Doppler frequency offset includes an absolute value of a maximum Doppler frequency offset and an absolute value of a minimum Doppler frequency offset.

Optionally, the reference data includes the satellite orbital altitude and the geocentric angle data of the current beam cell, and the processing unit 200 is specifically configured to:

obtain, based on the geocentric angle data and the satellite orbital altitude, a round-trip transmission delay change rate of a location corresponding to the geocentric angle data; and obtain a transmission delay TA offset based on the round-trip transmission delay change rate and a unidirectional transmission delay between a satellite and the location corresponding to the geocentric angle data; or obtain a TA offset based on the round-trip transmission delay change rate, a unidirectional transmission delay between a satellite and the location corresponding to the geocentric angle data, and the current TA update period duration.

A transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

Optionally, that the processing unit 200 is specifically configured to obtain, based on the geocentric angle data and the satellite orbital altitude, a round-trip transmission delay change rate of a location corresponding to the geocentric angle data is specifically performed according to the following formula:

$$T'_a = \frac{2}{c} \times \frac{\omega R(R+h)\sin\theta}{\sqrt{R^2 + (R+h)^2 - 2R(R+h)\cos\theta}},$$

where $T'_\alpha$ represents the round-trip transmission delay change rate of the location corresponding to the geocentric angle data, c represents the speed of light, ω represents a relative angular velocity between the satellite and a user, R represents the Earth radius, h represents the satellite orbital altitude, and θ represents the geocentric angle data.

That the processing unit 200 is specifically configured to obtain a transmission delay TA offset based on the round-trip transmission delay change rate and a unidirectional transmission delay between a satellite and the location corresponding to the geocentric angle data is specifically performed according to the following formula:

$$\Delta TA_{trans} = T'_\alpha \times t_{trans}, \text{ where}$$

$\Delta TA_{trans}$ represents the transmission delay TA offset, and $t_{trans}$ represents the unidirectional transmission delay between the satellite and the location corresponding to the geocentric angle data.

That the processing unit 200 obtains a TA offset based on the round-trip transmission delay change rate, a unidirectional transmission delay between a satellite and the location corresponding to the geocentric angle data and the current TA update period duration is specifically performed according to the following formula:

$$\Delta TA = T'_\alpha \times (t_{trans} + t_{update}), \text{ where}$$

ΔTA represents the TA offset, and $t_{update}$ represents the current TA update period duration.

Optionally, the reference data includes the satellite orbital altitude and the Doppler frequency offset of the current beam cell, and the processing unit 200 is further configured to:

obtain the round-trip transmission delay change rate of the current location based on the Doppler frequency offset data and a carrier frequency; and obtain a transmission delay TA offset based on the round-trip transmission delay change rate and a unidirectional transmission delay of the current location; or obtain a TA offset based on the round-trip transmission delay change rate, a unidirectional transmission delay of the current location, and the current TA update period duration.

A transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

Optionally, that the processing unit 200 is further configured tos the round-trip transmission delay change rate of the current location based on the Doppler frequency offset data and a carrier frequency is specifically performed according to the following formula:

$$T'_a = \frac{2}{f_c} f_d,$$

where $T'_\alpha$ represents a round-trip transmission delay change rate of a location corresponding to the geocentric angle data, $f_c$ represents the earner frequency, and $f_d$ represents a Doppler frequency offset of the current location.

That the processing unit 200 is further configured to obtain a transmission delay TA offset based on the round-trip transmission delay change rate and a unidirectional transmission delay of the current location is specifically performed according to the following formula:

$$\Delta TA_{trans} = T'_\alpha \times t_{trans}, \text{ where}$$

$\Delta TA_{trans}$ represents the transmission delay TA offset, and $t_{trans}$ represents a unidirectional transmission delay between a satellite and the location corresponding to the geocentric angle data.

That the processing unit 200 is further configured to obtain a TA offset based on the round-trip transmission delay change rate, a unidirectional transmission delay of the current location, and the current TA update period duration is specifically performed according to the following formula:

$$\Delta TA = T'_\alpha \times (t_{trans} + t_{update}), \text{ where}$$

ΔTA represents the TA offset, and $t_{update}$ represents the current TA update period duration.

It should be understood that, an example of a plurality of optional manners in this application may alternatively have another implementation when a calculation idea of this application is met, for example, a reasonable mathematical variation, a constant increase or decrease, or a parameter increase or decrease. This is not limited in this application.

Optionally, the processing unit 200 is specifically configured to:

when the terminal and a satellite are close to each other, add the updated TA value and an absolute value of the maximum TA offset to perform TA compensation; and when the terminal and the satellite are far away from each other, subtract an absolute value of the minimum transmission delay TA offset from the updated TA value to perform TA compensation.

Optionally, the TA compensation data further includes:

a minimum TA offset and a maximum transmission delay TA offset of the current beam cell; and the processing unit 200 is specifically configured to:

calculate a frame TA offset of each frame of data based on the TA compensation information and a ratio of the TA update period to a data frame length of to-be-sent uplink data; and perform TA compensation on a TA of each frame of data in the TA update period based on the frame TA offset.

Optionally, the processing unit 200 is specifically configured to:

when the terminal and a satellite are close to each other, calculate the frame TA offset based on the maximum TA offset, the maximum transmission delay TA offset, and the ratio of the TA update period to the data frame length of the to-be-sent uplink data; and select an absolute value of the maximum transmission delay TA offset and add the absolute value of the maximum transmission delay TA offset and N frame TA offsets; and perform TA compensation on the TA of each frame of data in the TA update period, where N is a sequence number of a data frame, and N is an integer greater than or equal to 1.

Optionally, the processing unit 200 is specifically configured to:

when the terminal and a satellite are far away from each other, calculate the frame TA offset based on the minimum TA offset, the minimum transmission delay TA offset, and the ratio of the TA update period to the data frame length; and select a negative value of an absolute value of the minimum transmission delay TA offset and subtract (N−1) frame TA offsets from the negative value of the absolute value of the minimum transmission delay TA offset; and perform TA compensation on the TA of each frame of data in the TA update period, where N is a sequence number of a data frame, and N is an integer greater than or equal to 1.

Optionally, the processing unit 200 is further configured to:

obtain location information of the terminal;

determine a relative location of the terminal in the beam cell based on the location information and a location of an edge point of the beam cell;

perform linearization processing on a TA offset between two edge points of the beam cell; and obtain a first slope of a TA offset linear change based on the TA offset between the edge points of the beam cell, or obtain a second slope of a transmission delay TA offset linear change based on a transmission delay TA offset between the edge points of the beam cell; and obtain a TA offset of the current location of the terminal based on the relative location of the terminal and the first slope, or obtain a transmission delay TA offset of the current location of the terminal based on the relative location of the terminal and the second slope.

When TA compensation is performed based on the updated TA value and the TA compensation information, the processing unit 200 is specifically configured to:

when the terminal and a satellite are close to each other, add the updated TA value and an absolute value of the TA offset of the current location of the terminal to perform TA compensation; and when the terminal and the satellite are far away from each other, subtract an absolute value of the transmission delay TA offset of the current location of the terminal from the updated TA value to perform TA compensation.

Optionally, the updated TA value sent by the base station and received by the terminal is an updated TA value sent by the base station after compensation is performed based on a transmission delay TA offset at a current moment.

For concepts, explanations, detailed descriptions, and other steps of the terminal that are related to the technical solutions provided in this embodiment of this application, refer to the descriptions of the content in the foregoing method embodiments. Details are not described herein again.

It may be understood that the units in FIG. 6 may also be applicable to the methods shown in FIG. 10 to FIG. 13.

Figure 7:
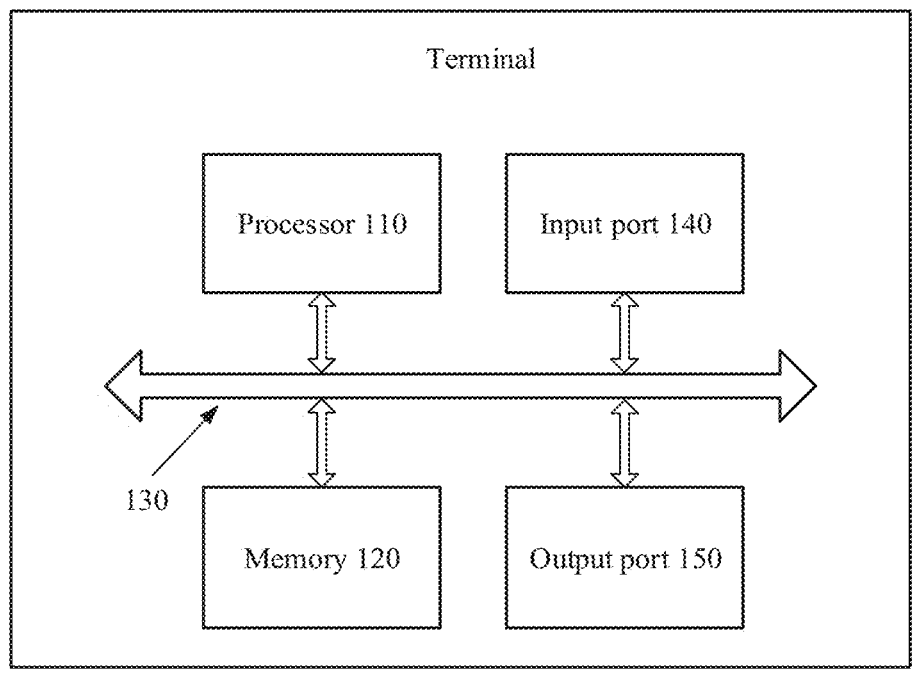
FIG. 7 is a schematic composition diagram of another terminal according to an embodiment of this application.

FIG. 7 is a schematic composition diagram of another terminal according to an embodiment of this application. As shown in FIG. 7, the terminal may include a processor 110, a memory 120, and a bus 130. The processor 110 is connected to the memory 120 through the bus 130. The memory 120 is configured to store instructions. The processor 110 is configured to execute the instructions stored in the memory 120, to implement the steps in the methods corresponding to FIG. 2 to FIG. 5 or FIG. 10 to FIG. 14.

Further, the terminal may further include an input port 140 and an output port 150. The processor 110, the memory 120, the input port 140, and the output port 150 may be connected through the bus 130.

The processor 110 is configured to execute the instructions stored in the memory 120, to control the input port 140 to receive a signal; and control the output port 150 to send a signal, to complete the steps performed by the terminal in the foregoing methods. The input port 140 and the output port 150 may be a same physical entity or different physical entities. When the input port 140 and the output port 150 are the same physical entity, the input port 140 and the output port 150 may be collectively referred to as an input/output port. The memory 120 may be integrated into the processor 110, or may be disposed separately from the processor 110.

In an implementation, it may be considered that functions of the input port 140 and the output port 150 are implemented by using a transceiver circuit or a dedicated transceiver chip. It may be considered that the processor 110 is implemented by using a dedicated processing chip, a processing circuit, a processor, or a general-purpose chip.

In another implementation, it may be considered that the terminal provided in this embodiment of this application is implemented by using a general-purpose computer. To be specific, program code that is used to implement functions of the processor 110, the input port 140, and the output port 150 is stored in the memory, and a general-purpose processor implements the functions of the processor 110, the input port 140, and the output port 150 by executing the code in the memory.

For concepts, explanations, detailed descriptions, and other steps of the terminal that are related to the technical solutions provided in this embodiment of this application, refer to the descriptions of the content in the foregoing methods or other embodiments. Details are not described herein again.

Figure 8:
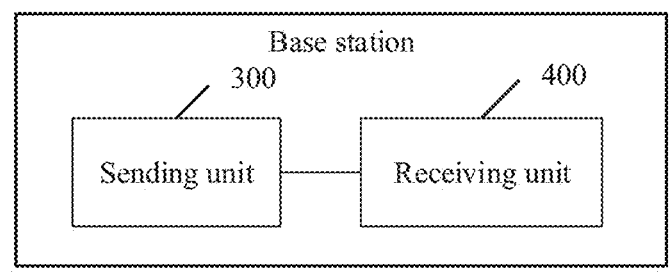
FIG. 8 is a schematic composition diagram of a base station according to an embodiment of this application.

FIG. 8 is a schematic composition diagram of a base station according to an embodiment of this application. The base station may include:

a sending unit 300, configured to send, to a terminal, an updated timing advance TA value and a beam cell identity of a beam cell in which the terminal is located; and a receiving unit 400, configured to receive uplink data sent by the terminal by using a TA value obtained after TA compensation is performed; where the beam cell identity corresponds to TA compensation information used by the terminal to perform TA compensation on the updated TA value.

Optionally, when the terminal is located in the beam cell, a TA offset of the terminal is a sum of a transmission delay TA offset and an update period TA offset, and the update period TA offset is a product of a round-trip transmission delay change rate of a current location and current TA update period duration;

the TA compensation information includes TA compensation data or reference data used to calculate the TA compensation data;

the TA compensation data includes a maximum TA offset, a minimum TA offset, a maximum transmission delay TA offset, and a minimum transmission delay TA offset of a current beam cell; and the reference data includes a satellite orbital altitude and geocentric angle data of the current beam cell, where the geocentric angle data includes a maximum geocentric angle and a minimum geocentric angle; or the reference data includes a Doppler frequency offset of the current beam cell, where the Doppler frequency offset includes an absolute value of a maximum Doppler frequency offset and an absolute value of a minimum Doppler frequency offset.

Optionally, the base station may further include a processing unit, and the processing unit may be configured to divide a satellite into beam cells.

Optionally, when the base station sends the updated TA value, the processing unit of the base station may further compensate for the updated TA value based on a transmission delay TA offset at a current moment, and then send an updated TA value after compensation is performed.

For concepts, explanations, detailed descriptions, and other steps of the base station that are related to the technical solutions provided in this embodiment of this application, refer to the descriptions of the content in the foregoing methods or other embodiments. Details are not described herein again.

It may be understood that the units in FIG. 8 may also be applicable to the methods shown in FIG. 10 to FIG. 13.

Figure 9:
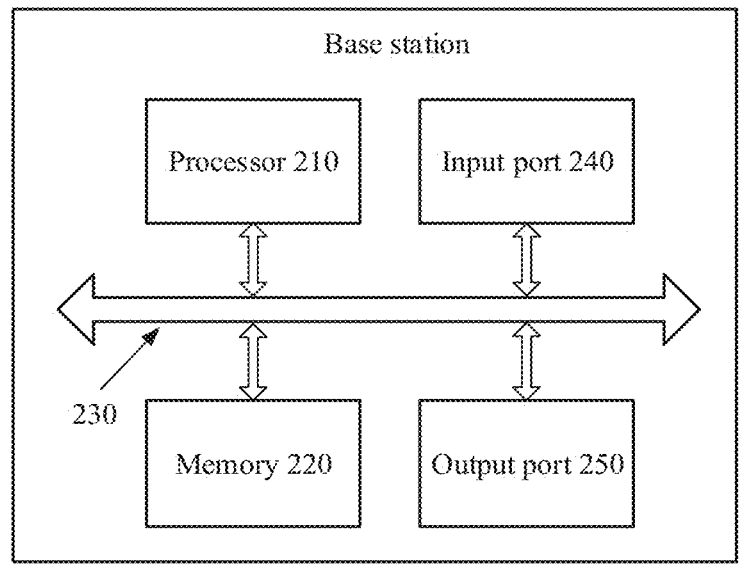
FIG. 9 is a schematic composition diagram of another base station according to an embodiment of this application.
Figure 10:
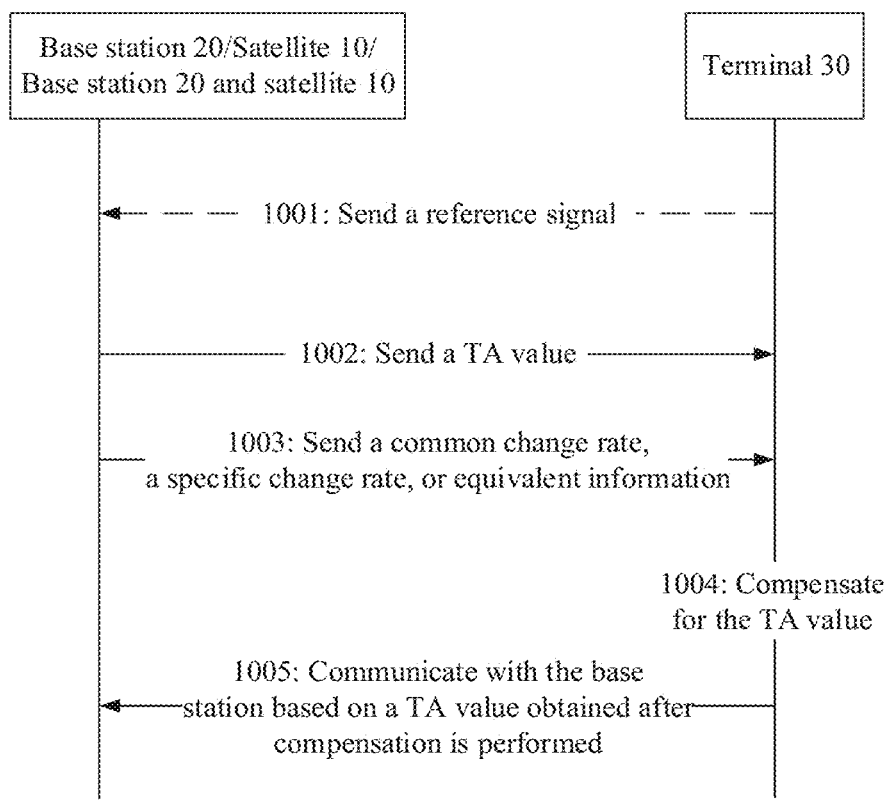
FIG. 10 is a flowchart of another method according to an embodiment of this application.

FIG. 9 is a schematic composition diagram of another base station according to an embodiment of this application. As shown in FIG. 9, the base station may include a processor 210, a memory 220, and a bus 230. The processor 210 is connected to the memory 220 through the bus 230. The memory 220 is configured to store instructions. The processor 210 is configured to execute the instructions stored in the memory 220, to implement steps performed by the base station in the methods corresponding to FIG. 2 to FIG. 5 or FIG. 10 to FIG. 14.

Further, the base station may further include an input port 240 and an output port 250. The processor 210, the memory 220, the input port 240, and the output port 250 may be connected through the bus 230.

The processor 210 is configured to execute the instructions stored in the memory 220, to control the input port 240 to receive a signal; and control the output port 250 to send a signal, to complete the steps performed by the base station in the foregoing methods. The input port 240 and the output port 250 may be a same physical entity or different physical entities. When the input port 240 and the output port 250 are the same physical entity, the input port 240 and the output port 250 may be collectively referred to as an input/output port. The memory 220 may be integrated into the processor 210, or may be disposed separately from the processor 210.

In an implementation, it may be considered that functions of the input port 240 and the output port 250 are implemented by using a transceiver circuit or a dedicated transceiver chip. It may be considered that the processor 210 is implemented by using a dedicated processing chip, a processing circuit, a processor, or a general-purpose chip.

In another implementation, it may be considered that the terminal provided in this embodiment of this application is implemented by using a general-purpose computer. To be specific, program code that is used to implement functions of the processor 210, the input port 240, and the output port 250 is stored in the memory, and a general-purpose processor implements the functions of the processor 210, the input port 240, and the output port 250 by executing the code in the memory.

For concepts, explanations, detailed descriptions, and other steps of the base station that are related to the technical solutions provided in this embodiment of this application, refer to the descriptions of the content in the foregoing methods or other embodiments. Details are not described herein again.

A person skilled in the art may understand that, for ease of description, FIG. 7 and FIG. 9 show only one memory and only one processor. Actually, there may be a plurality of processors and a plurality of memories. The memory may also be referred to as a storage medium, a storage device, or the like. This is not limited in the embodiments of this application.

It should be understood that the processor in the embodiments of this application may be a central processing unit (CPU), or may be another general-purpose processor, a digital signal processor (DSP), an application-specific integrated circuit (ASIC), a field-programmable gate array (FPGA), or another programmable logic device, discrete gate or transistor logic device, discrete hardware component, or the like.

The memory may include a read-only memory and a random access memory, and provide instructions and data to the processor. A part of the memory may further include a non-volatile random access memory.

The bus may further include a power bus, a control bus, a status signal bus, and the like, in addition to a data bus. However, for clear description, various types of buses in the figure are marked as the bus.

In an implementation process, steps in the foregoing methods may be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

According to the method provided in the embodiments of this application, an embodiment of this application further provides a system, including the foregoing base station, the terminal, the satellite, and the like.

Sequence numbers of the foregoing processes do not mean execution sequences in various embodiments of this application. The execution sequences of the processes should be determined based on functions and internal logic of the processes, and should not be constructed as any limitation on the implementation processes of the embodiments of this application.

A person of ordinary skill in the art may be aware that, in combination with illustrative logical blocks (illustrative logical block, "ILB" for short) described in the embodiments disclosed in this specification, steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage dev ice, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A timing advance update method, comprising:
receiving, from a base station and by a terminal, an updated timing advance (TA) value and a beam cell identity of a beam cell in which the terminal is located;
obtaining, by the terminal, TA compensation information based on the beam cell identity, wherein the TA compensation information comprises reference data, wherein the reference data. comprises a maximum TA offset and a minimum transmission delay TA offset of a current beam cell, and the reference data comprises a satellite orbital altitude of a satellite and geocentric angle data of the current beam cell, wherein the geocentric angle data comprises a maximum geocentric angle and a minimum geocentric angle, and wherein the terminal obtains, based on the geocentric angle data and the satellite orbital altitude a round-trip transmission delay change rate of a location corresponding to the geocentric angle data according to the following formula:

$$T'_a = \frac{2}{c} \times \frac{\omega R(R+h)\sin\theta}{\sqrt{R^2 + (R+h)^2 - 2R(R+h)\cos\theta}},$$

wherein
$T'_\alpha$ represents the round-trip transmission delay change rate of the location corresponding to the geocentric angle data, c represents a speed of light, $\omega$ represents a relative angular velocity between the satellite and a user, R represents an Earth radius, h represents the satellite orbital altitude, and $\theta$ represents the geocentric angle data;
performing, by the terminal, TA compensation in a TA update period based on the updated TA value and the TA compensation information; and
sending, by the terminal, uplink data by using a TA value obtained after TA compensation is performed.

2. The timing advance update method according to claim 1, wherein:
the terminal obtains a transmission delay TA offset based on the round-trip transmission delay change rate and a unidirectional transmission delay between the satellite and the location corresponding to the geocentric angle data: or
the terminal obtains a TA offset based on the round-trip transmission delay change rate, a unidirectional transmission delay between the satellite and the location corresponding to the geocentric angle data, and current TA update period duration, and wherein
a transmission delay TA offset Obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

3. The timing advance update method according to claim 2, wherein
that the terminal obtains a transmission delay TA offset based on the round-trip transmission delay change rate and a unidirectional transmission delay between the satellite and the location corresponding to the geocentric angle data is performed according to the following formula:

$\Delta TA_{trans} = T'_\alpha \times t_{trans}$, wherein $\Delta TA_{trans}$ represents the transmission delay TA offset, and $t_{trans}$ represents the unidirectional transmission delay between the satellite and the location corresponding to the geocentric angle data, and wherein
that the terminal obtains a TA offset based on the round-trip transmission delay change rate, a unidirectional transmission delay between the satellite and the location corresponding to the geocentric angle data, and current TA update period duration is performed according to the following formula:

$\Delta TA = T'_\alpha \times (t_{trans} \times t_{update})$, where $\Delta TA$ represents the TA offset, and $t_{update}$ represents the current TA update period duration.

4. The timing advance update method according to claim 1, wherein performing, by the terminal, TA compensation based on the updated TA value and the TA compensation information comprises:
when a distance between the terminal and the satellite is less than or equal to a first communication distance, adding, by the terminal, the updated TA value and an absolute value of the maximum TA offset to perform TA compensation; or
when the distance between the terminal and the satellite is greater than or equal to a second communication distance, subtracting, by the terminal, an absolute value of the minimum transmission delay TA offset from the updated TA value to perform TA compensation, wherein the second communication distance is greater than the first communication distance.

5. The timing advance update method according to claim 1, wherein the TA compensation data further comprises:
a minimum TA offset and a maximum transmission delay TA offset of the current beam cell, and wherein
the performing, by the terminal, TA compensation based on the updated TA value and the TA compensation information comprises:
calculating, by the terminal, a frame TA offset of each frame of data based on the TA compensation information and a ratio of the TA update period to a data frame length of to-be-sent uplink data; and
performing, by the terminal, TA compensation on a TA of each frame of data in the TA update period based on the frame TA offset.

6. The timing advance update method according to claim 5, wherein when a distance between the terminal and the satellite is less than or equal to a first communication distance:
the calculating, by the terminal, a frame TA offset of each frame of data based on the TA compensation information and a ratio of the TA update period to the data frame length of the to-be-sent uplink data comprises:
calculating, by the terminal, the frame TA offset based on the maximum TA offset, the maximum transmission delay TA offset, and the ratio of the TA update period to the data frame length of the to-be-sent uplink data, and
the performing, by the terminal, TA. compensation on a TA of each frame of data in the TA update period based on the frame TA offset comprises:
selecting, by the terminal, an absolute value of the maximum transmission delay TA offset;
adding the absolute value of the maximum transmission delay TA offset and N frame TA offsets; and
performing TA compensation on the TA of each frame of data in the TA update period, wherein N is a sequence number of a data frame, and N is an integer greater than or equal to 1.

7. The timing advance update method according to claim 6, wherein when the distance between the terminal and the satellite is greater than or equal to a second communication distance, and wherein the second communication distance is greater than the first communication distance:
the calculating, by the terminal, a frame TA offset of each frame of data based on the TA compensation information and a ratio of the TA update period to a data frame length comprises:
calculating, by the terminal, the frame TA offset based on the minimum TA offset, the minimum transmission delay TA offset, and the ratio of the TA update period to the data frame length of the to-be-sent uplink data, and
the performing, by the terminal, TA compensation on a TA of each frame of data in the TA update period based on the frame TA offset comprises:
selecting, by the terminal, a negative value of an absolute value of the minimum transmission delay TA offset;
subtracting (N−1) frame TA offsets from the negative value of the absolute value of the minimum transmission delay TA offset; and
performing TA compensation on the TA of each frame of data in the TA update period, wherein N is a sequence number of a data frame, and N is an integer greater than or equal to 1.

8. The timing advance update method according to claim 1, wherein the method further comprises:
obtaining, by the terminal, location information of the terminal;
determining, by the terminal, a relative location of the terminal in the beam cell based on the location information and a location of an edge point of the beam cell;
performing, by the terminal, linearization processing on a TA offset between two edge points of the beam cell;
obtaining a first slope of a TA offset linear change based on the TA offset between the two edge points of the beam cell, or
obtaining a second slope of a transmission delay TA offset linear change based on a transmission delay TA offset between the two edge points of the beam cell; and
obtaining a TA offset of a current location of the terminal based on the relative location of the terminal and the first slope, or
obtaining a transmission delay TA offset of a current location of the terminal based on the relative location of the terminal and the second slope, wherein
the performing, by the terminal, TA compensation based on the updated TA value and the TA compensation information comprises:
when a distance between the terminal and a satellite is less than or equal to a first communication distance, adding, by the terminal, the updated TA value and an absolute value of the TA offset of the current location of the terminal to perform TA compensation; and when the distance between the terminal and the satellite is greater than or equal to a second communication distance, subtracting, by the terminal, an absolute value of the transmission delay TA offset of the current location of the terminal from the updated TA value to perform TA compensation, wherein the second communication distance is greater than the first communication di stance.

9. The timing advance update method according to claim 1, wherein
the updated TA value sent by the base station and received by the terminal is an updated TA value sent by the base station after compensation is performed based on a transmission delay TA offset at a current moment.

10. A terminal, comprising:
a memory storing instructions; and
at least one processor coupled to the memory-, wherein the instructions for execution by the at least one processor, and wherein the instructions instruct the at least one processor to:
receive, from a base station, an updated timing advance TA value and a beam cell identity of a beam cell in which the terminal is located;
obtain corresponding TA compensation information based on the beam cell identity, wherein the TA compensation information comprises reference data, wherein the reference data comprises a maximum TA offset and a minimum transmission delay TA. offset of a current beam cell, and the reference data comprises a satellite orbital altitude of a satellite and geocentric angle data of the current beam cell, wherein the geocentric angle data comprises a maximum geocentric angle and a minimum geocentric angle, and wherein the terminal obtains, based on the geocentric angle data and the satellite orbital altitude, a round-trip transmission delay change rate of a location corresponding to the geocentric angle data according to the following formula:

$$T'_a = \frac{2}{c} \times \frac{\omega R(R+h)\sin\theta}{\sqrt{R^2 + (R+h)^2 - 2R(R+h)\cos\theta}}.$$

wherein
$T'_\alpha$ represents the round-trip transmission delay change rate of the location corresponding to the geocentric angle data, c represents a speed of light, ω represents a relative angular velocity between the satellite and a user, R represents an Earth radius, h represents the satellite orbital altitude, and θ represents the geocentric angle data;
perform TA compensation in a TA update period based on the updated TA value and the corresponding TA compensation information; and
send uplink data by using a TA value obtained after TA compensation is performed.

11. The terminal according to claim 10,
wherein the instructions further instruct the at least one processor to:
obtain a transmission delay TA offset based on the round-trip transmission delay change rate and a unidirectional transmission delay between the satellite and the location corresponding to the geocentric angle data; or
obtain a TA offset based on the round-trip transmission delay change rate, a unidirectional transmission delay between the satellite and the location corresponding to the geocentric angle data, and current TA update period duration, wherein
a transmission delay TA offset obtained by the terminal based on the maximum geocentric angle in the geocentric angle data is a maximum transmission delay TA offset, a transmission delay TA offset obtained by the terminal based on the minimum geocentric angle in the geocentric angle data is the minimum transmission delay TA offset, the maximum TA offset is a sum of the maximum transmission delay TA offset and a maximum update period TA offset, and a minimum TA offset is a sum of the minimum transmission delay TA offset and a minimum update period TA offset.

12. The terminal according to claim 10, wherein the instructions further instruct the at least one processor to:
add the updated TA value and an absolute value of the maximum TA offset to perform TA compensation when a distance between the terminal and the satellite is less than or equal to a first communication distance; or
subtract an absolute value of the minimum transmission delay TA offset from the updated TA value to perform TA compensation when the distance between the terminal and the satellite is greater than or equal to a second communication distance, wherein the second communication distance is greater than the first communication distance.

13. The terminal according to claim 10, wherein the TA compensation data further comprises:
a minimum TA offset and a maximum transmission delay TA offset of the current beam cell, and wherein
the performing TA compensation in the TA update period based on the updated TA value and the TA compensation information comprises:
calculating a frame TA offset of each frame of data based on the TA compensation information and a ratio of the TA update period to a data frame length of to-be-sent uplink data; and
performing TA compensation on a TA of each frame of data in the TA update period based on the frame TA offset.

14. A timing advance update method, comprising:
receiving, from a base station and by a terminal, an updated timing advance (TA) value and a beam cell identity of a beam cell in which the terminal is located;
obtaining, by the terminal, TA compensation information based on the beam cell identity, wherein the TA compensation information comprises reference data, wherein the reference data comprises a maximum TA offset and a minimum transmission delay TA offset of a current beam cell, and the reference data comprises a satellite orbital altitude of a satellite and Doppler frequency offset of the current beam cell, and wherein the terminal obtains a round-trip transmission delay change rate of a current location based on the Doppler frequency offset and a carrier frequency according to the following formula:

$$T'_a = \frac{2}{f_c} f_d,$$

wherein $T'_\alpha$ represents the round-trip transmission delay change rate of the current location, $f_c$ represents the carrier frequency, and $f_d$ represents a Doppler frequency offset of the current location;

performing, by the terminal, TA compensation in a TA update period based on the updated TA value and the TA compensation information; and sending, by the terminal, uplink data by using a TA value obtained after TA compensation is performed.

15. The timing advance update method according to claim 14, wherein:

the terminal obtains a transmission delay TA offset based on the round-trip transmission delay change rate and a unidirectional transmission delay of the current location, or the terminal obtains a TA offset based on the round-trip transmission delay change rate, a unidirectional transmission delay of the current location, and current TA update period duration.

16. The timing advance update method according to claim 15, wherein that the terminal obtains a transmission delay TA offset based on the round-trip transmission delay change rate and a unidirectional transmission delay of the current location is performed according to the following formula:

$$\Delta TA_{trans} = T'_\alpha \times t_{trans}, \text{ wherein}$$

$\Delta TA_{trans}$ represents the transmission delay TA offset, and $t_{trans}$ represents the unidirectional transmission delay of the current location, and wherein that the terminal obtains a TA offset based on the round-trip transmission delay change rate, a unidirectional transmission delay of the current location, and current TA update period duration is performed according to the following formula:

$$\Delta TA = T'_\alpha \times (t_{trans} + t_{update}), \text{ where}$$

$\Delta TA$ represents the TA offset, and $t_{update}$ represents the current TA update period duration.

17. The timing advance update method according to claim 14, wherein performing, by the terminal, TA compensation based on the updated TA value and the TA compensation information comprises:

when a distance between the terminal and the satellite is less than or equal to a first communication distance, adding, by the terminal, the updated TA value and an absolute value of the maximum TA offset to perform TA compensation; or when the distance between the terminal and the satellite is greater than or equal to a second communication distance, subtracting, by the terminal, an absolute value of the minimum transmission delay TA offset from the updated TA value to perform TA compensation, wherein the second communication distance is greater than the first communication distance.

* * * * *

UNITED STATES PATENT AND TRADEMARK OFFICE
CERTIFICATE OF CORRECTION

PATENT NO. : 11,968,640 B2
APPLICATION NO. : 17/407526
DATED : April 23, 2024
INVENTOR(S) : Chenlei Xu et al.

It is certified that error appears in the above-identified patent and that said Letters Patent is hereby corrected as shown below:

In the Claims

Column 46, Line 12 (Approx.), Claim 1, please delete "data." and insert therefore -- data --;

Column 46, Line 51, Claim 2, please delete "data:" and insert therefore -- data; --;

Column 46, Line 57, Claim 2, please delete "Obtained" and insert therefore -- obtained --;

Column 47, Line 22 (Approx.), Claim 3, please delete "where" and insert therefore -- wherein --;

Column 48, Line 1, Claim 6, please delete "TA." and insert therefore -- TA --;

Column 49, Line 8, Claim 8, please delete "di stance." and insert therefore -- distance --;

Column 49, Line 17, Claim 10, please delete "memory-," and insert therefore -- memory, --;

Column 49, Line 28 (Approx.), Claim 10, please delete "TA." and insert therefore -- TA --;

Column 49, Line 41-42, Claim 10, please delete "$T'_a = \frac{2}{c} \times \frac{\omega R(R+h)\sin\theta}{\sqrt{R^2 + (R+h)^2 - 2R(R+h)\cos\theta}}.$" and insert therefore -- $T'_a = \frac{2}{c} \times \frac{\omega R(R+h)\sin\theta}{\sqrt{R^2 + (R+h)^2 - 2R(R+h)\cos\theta}},$ --;

Column 52, Line 9, Claim 16, please delete "where" and insert therefore -- wherein --.

Signed and Sealed this
Third Day of September, 2024

Katherine Kelly Vidal
*Director of the United States Patent and Trademark Office*